United States Patent
Laurin et al.

(10) Patent No.: US 11,102,929 B2
(45) Date of Patent: *Aug. 31, 2021

(54) INTEGRATED TRANSAXLE STANDING MOWER OPERATOR PLATFORM

(71) Applicant: Briggs & Stratton, LLC, Wauwatosa, WI (US)

(72) Inventors: Robert S. Laurin, Durhamville, NY (US); E. Mark Lynch, Munnsville, NY (US); Derrick R. Camenga, Sherburne, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/132,631

(22) Filed: Sep. 17, 2018

(65) Prior Publication Data

US 2019/0014721 A1  Jan. 17, 2019

Related U.S. Application Data

(63) Continuation of application No. 14/955,123, filed on Dec. 1, 2015, now Pat. No. 10,091,936.
(Continued)

(51) Int. Cl.
*A01D 69/03* (2006.01)
*A01D 34/64* (2006.01)
(Continued)

(52) U.S. Cl.
CPC .............. *A01D 69/03* (2013.01); *A01D 34/64* (2013.01); *A01D 34/82* (2013.01); *B60T 7/12* (2013.01); *A01D 2101/00* (2013.01)

(58) Field of Classification Search
CPC .. A01D 69/03; A01D 2101/00; A01D 34/001; A01D 34/08; A01D 34/10;
(Continued)

(56) References Cited

U.S. PATENT DOCUMENTS 5,004,251 A   4/1991  Velke et al.
5,507,138 A   4/1996  Wright et al.
(Continued)

OTHER PUBLICATIONS

Information about Related Patents and Patent Applications, see section 6 of the accompanying Information Disclosure Statement Letter, which concerns Related Patents and Patent Applications.

*Primary Examiner* — Adam J Behrens
(74) *Attorney, Agent, or Firm* — Foley & Lardner LLP

(57) ABSTRACT

A standing ride on mower includes a frame, a right drive wheel, a left drive wheel, a prime mover, a cutting deck assembly, a right side integrated transaxle operating under influence of the prime mover to drive rotation of the right drive wheel, the right side integrated transaxle including a right side housing, a right hydraulic pump within the housing, and a right hydraulic motor within the housing, a left side integrated transaxle operating under the influence of the prime mover to drive rotation of the left drive wheel, the left side integrated transaxle including a left side housing, a left hydraulic pump within the housing, and a left hydraulic motor within the housing, and an operator platform to support a standing operator of the mower. The operator platform extends beneath the left housing and beneath the right housing.

20 Claims, 24 Drawing Sheets

Related U.S. Application Data

(60) Provisional application No. 62/146,125, filed on Apr. 10, 2015, provisional application No. 62/086,386, filed on Dec. 2, 2014.

(51) Int. Cl.
    *A01D 34/82* (2006.01)
    *B60T 7/12* (2006.01)
    *A01D 101/00* (2006.01)

(58) Field of Classification Search
    CPC .. A01D 34/38; A01D 34/42–49; A01D 34/60; A01D 34/63; A01D 34/64; A01D 34/66; A01D 34/68; A01D 34/69; A01D 34/82; A01D 2034/6831; B60T 7/12
    See application file for complete search history.

(56) References Cited

U.S. PATENT DOCUMENTS

| | | | |
|---|---|---|---|
| 5,600,944 A | 2/1997 | Wright et al. | |
| 5,697,623 A * | 12/1997 | Bermes | A01D 34/001 172/433 |
| 5,706,909 A * | 1/1998 | Bevins | B60R 25/04 180/273 |
| 5,765,347 A | 6/1998 | Wright et al. | |
| 5,809,755 A * | 9/1998 | Velke | A01D 34/001 180/19.3 |
| 5,809,756 A * | 9/1998 | Scag | A01D 34/001 280/32.7 |
| 5,882,020 A | 3/1999 | Velke | |
| 5,964,082 A | 10/1999 | Wright et al. | |
| 5,984,031 A * | 11/1999 | Velke | A01D 34/001 180/19.3 |
| 6,044,634 A | 4/2000 | Velke et al. | |
| 6,059,055 A | 5/2000 | Velke et al. | |
| 6,062,582 A | 5/2000 | Martin | |
| 6,085,504 A | 7/2000 | Wright et al. | |
| 6,094,897 A | 8/2000 | Velke et al. | |
| 6,138,446 A | 10/2000 | Velke et al. | |
| 6,145,855 A | 11/2000 | Bellis, Jr. | |
| 6,155,034 A | 12/2000 | Velke et al. | |
| 6,182,429 B1 | 2/2001 | Velke et al. | |
| 6,189,304 B1 | 2/2001 | Velke et al. | |
| 6,189,305 B1 | 2/2001 | Wright et al. | |
| 6,205,753 B1 * | 3/2001 | Velke | A01D 34/6806 56/14.7 |
| 6,234,495 B1 | 5/2001 | Velke | |
| 6,276,486 B1 | 8/2001 | Velke et al. | |
| 6,301,865 B1 | 10/2001 | Velke et al. | |
| 6,327,839 B1 | 12/2001 | Velke et al. | |
| 6,390,225 B2 | 5/2002 | Velke et al. | |
| 6,405,515 B1 | 6/2002 | Wright et al. | |
| 6,415,587 B1 | 7/2002 | Velke et al. | |
| 6,438,930 B1 | 8/2002 | Velke et al. | |
| 6,438,931 B1 | 8/2002 | Velke et al. | |
| 6,442,917 B1 | 9/2002 | Velke et al. | |
| 6,488,291 B1 | 12/2002 | Bellis, Jr. | |
| 6,490,849 B1 * | 12/2002 | Scag | A01D 34/001 56/10.8 |
| 6,497,422 B1 * | 12/2002 | Bellis, Jr. | B62D 49/065 280/32.7 |
| 6,499,282 B1 * | 12/2002 | Velke | A01D 34/6806 56/14.7 |
| 6,782,964 B1 * | 8/2004 | Korthals | B62D 51/02 180/273 |
| 7,111,459 B1 * | 9/2006 | Brookens | A01D 34/6806 60/484 |
| 8,141,886 B1 * | 3/2012 | Sugden | A01D 34/82 280/32.5 |
| 9,435,324 B2 * | 9/2016 | Richardson | F01C 1/103 |
| 9,485,906 B2 * | 11/2016 | Pflanzer | F16P 3/00 |
| 9,499,199 B1 * | 11/2016 | Laymon | B62D 11/003 |
| 9,969,258 B1 * | 5/2018 | Hauser | A01D 69/06 |
| 2001/0001170 A1 | 5/2001 | Velke et al. | |
| 2002/0014063 A1 | 2/2002 | Velke et al. | |
| 2002/0059788 A1 | 5/2002 | Velke et al. | |
| 2002/0104706 A1 | 8/2002 | Velke et al. | |
| 2002/0162314 A1 | 11/2002 | Velke et al. | |
| 2002/0174637 A1 | 11/2002 | Velke et al. | |
| 2002/0178709 A1 * | 12/2002 | Velke | A01D 34/82 56/10.9 |
| 2003/0010007 A1 | 1/2003 | Wright et al. | |
| 2003/0084653 A1 | 5/2003 | Velke et al. | |
| 2003/0221402 A1 | 12/2003 | Velke et al. | |
| 2004/0055267 A1 | 3/2004 | Wright et al. | |
| 2004/0093840 A1 | 5/2004 | Velke et al. | |
| 2004/0103629 A1 | 6/2004 | Velke et al. | |
| 2005/0183409 A1 * | 8/2005 | Barrier | A01D 34/824 56/11.9 |
| 2007/0039302 A1 * | 2/2007 | Velke | A01D 69/03 56/11.9 |
| 2007/0039304 A1 | 2/2007 | Wright et al. | |
| 2007/0044446 A1 * | 3/2007 | Wright | A01D 34/824 56/11.9 |
| 2007/0107403 A1 * | 5/2007 | Velke | A01D 69/10 56/14.7 |
| 2007/0151222 A1 * | 7/2007 | Iida | A01D 69/03 56/157 |
| 2008/0107403 A1 | 5/2008 | Urano | |
| 2008/0163596 A1 | 7/2008 | Velke et al. | |
| 2008/0191546 A1 * | 8/2008 | Plantamura | B60T 7/12 303/28 |
| 2008/0314013 A1 | 12/2008 | Velke et al. | |
| 2009/0160245 A1 * | 6/2009 | Accardi | B60T 15/041 303/3 |
| 2009/0302562 A1 * | 12/2009 | Kallevig | A01D 34/64 280/32.5 |
| 2011/0067934 A1 * | 3/2011 | Dong | B60K 17/043 180/6.2 |
| 2011/0083413 A1 * | 4/2011 | Jackson | A01D 34/82 56/14.7 |
| 2013/0074464 A1 * | 3/2013 | Gindt | A01D 69/03 56/11.4 |
| 2013/0074467 A1 * | 3/2013 | Zwieg | A01D 34/82 56/17.1 |
| 2013/0291508 A1 * | 11/2013 | Melone | B60K 1/00 56/14.7 |
| 2014/0223898 A1 * | 8/2014 | Iida | B60K 17/105 60/491 |
| 2014/0231155 A1 * | 8/2014 | Clark | B62D 11/006 180/6.48 |

* cited by examiner

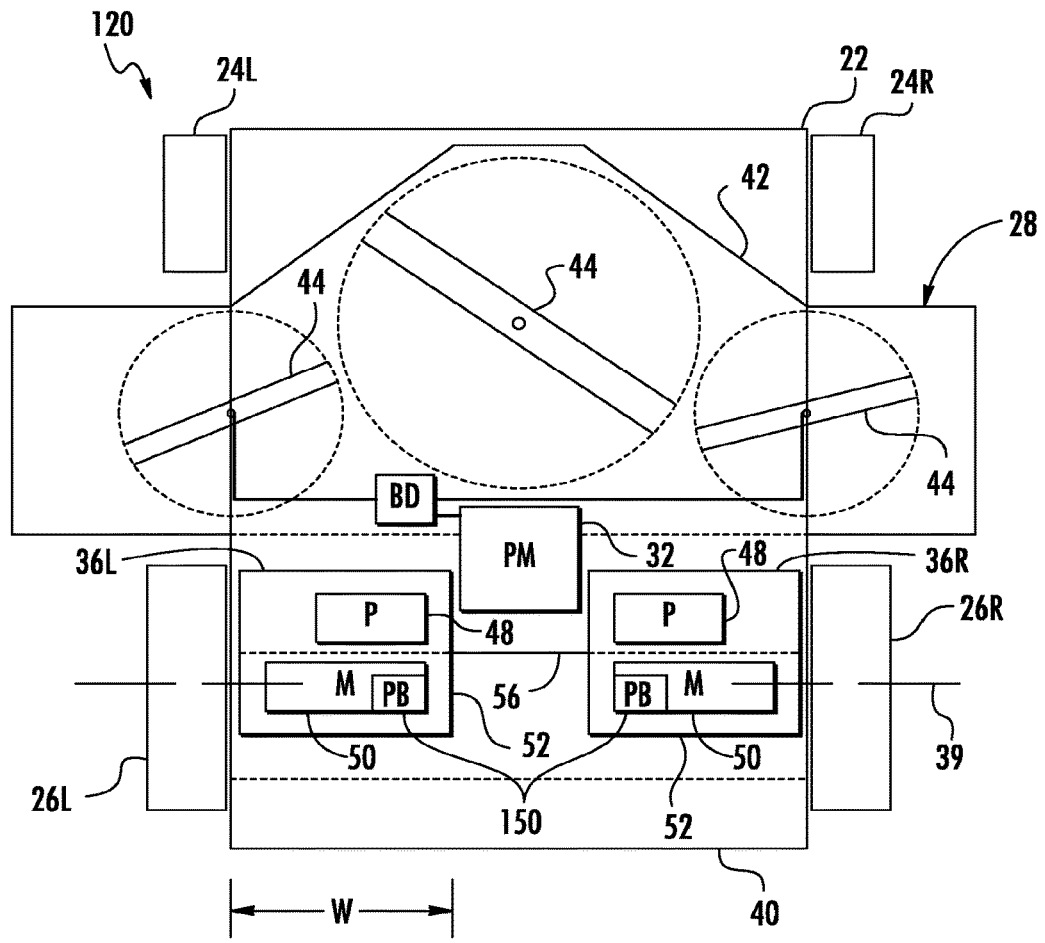
FIG. 3
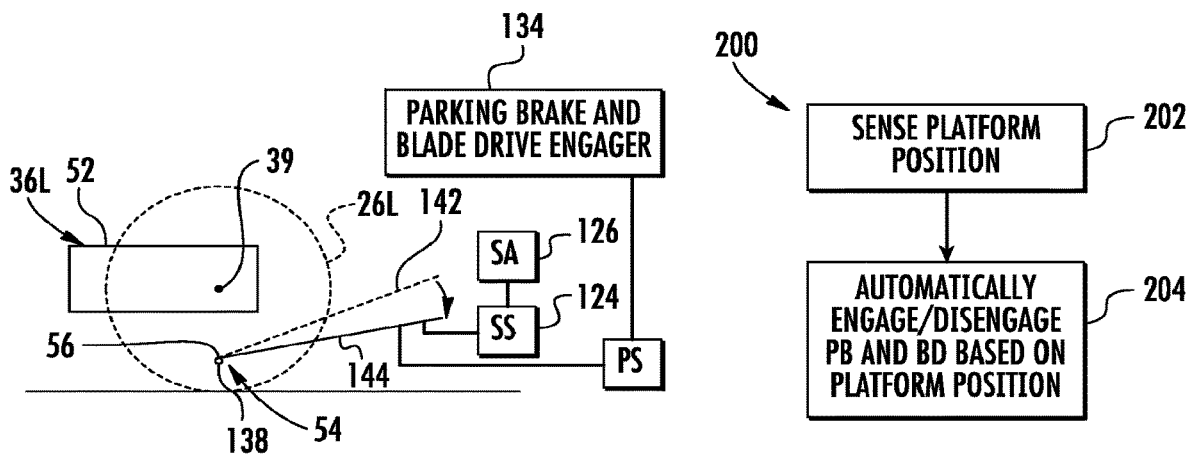
FIG. 4
FIG. 5

INTEGRATED TRANSAXLE STANDING MOWER OPERATOR PLATFORM

CROSS-REFERENCE TO RELATED APPLICATIONS

The present application is a continuation of, and claims priority to, U.S. patent application Ser. No. 14/955,123, filed Dec. 1, 2015, which claims priority under 35 U.S.C. 119 to U.S. Provisional Application 62/086,386, filed Dec. 2, 2014, and U.S. Provisional Application 62/146,125, filed Apr. 10, 2015, the full disclosures of which are hereby incorporated by reference.

BACKGROUND

Standing mowers support a standing operator behind a cutting deck and engine at the rear of the mower. Integrated transaxle standing mowers utilize integrated transaxles to drive the mower. An integrated transaxle generally comprises an integrated hydraulic pump and motor.

BRIEF DESCRIPTION OF THE DRAWINGS

FIG. 3 is a schematic diagram of another example mower.
FIG. 4 is a side view of a portion of the mower of FIG. 3.
FIG. 5 is a flow diagram of an example method for operating the mower of FIG. 3.

DETAILED DESCRIPTION OF EXAMPLES

Figure 1:
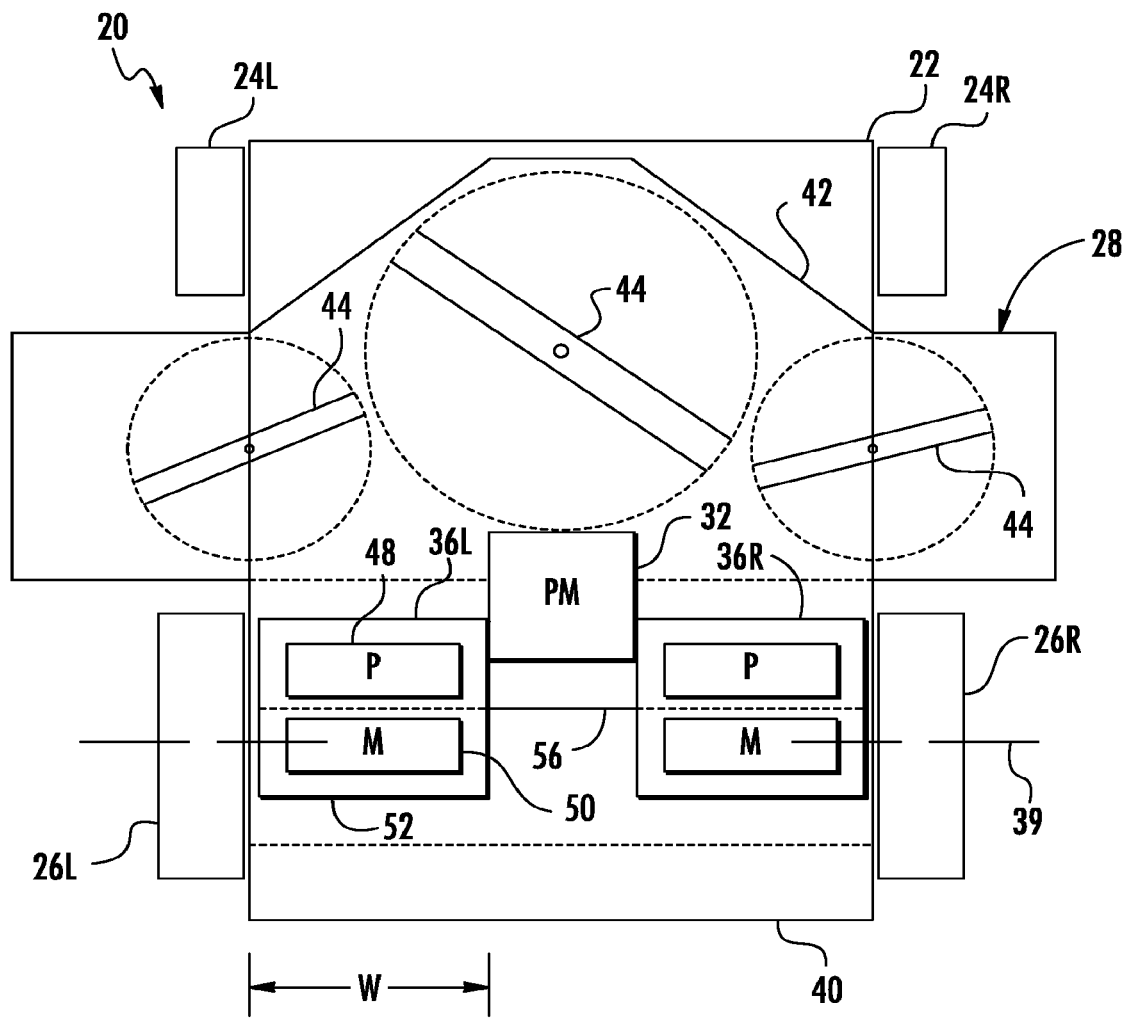
FIG. 1 is a schematic diagram of an example mower.

FIG. 1 schematically illustrates an example integrated transaxle standing lawnmower or mower 20. As will be described hereafter, mower 20 is configured to support an operator platform at least partially below both integrated transaxles, allowing an operator to assume a more ergonomic position and achieve enhanced weight distribution.

As schematically shown by FIG. 1, mower 20 comprises frame 22, left and right front wheels 24L and 24R (collectively referred to as wheels 24), left and right drive wheels 26L, 26R (collectively referred to as wheels 26), cutting deck assembly 28, prime mover 32, left side and right side integrated transaxles 36L, 36R (collectively referred to as integrated transaxles 36) and operator platform 40. Frame 22 comprises a platform or framework 40 supported by wheels 24, 26 above ground or terrain. Frame 22 supports the remaining components of mower 20.

Wheels 24 extend from a forward end of mower 20. In the example illustrated, wheels 24 are passive, not driven under power. In one implementation, wheels 24 comprise caster wheels, being able to swivel with respect to frame 22 about a vertical axes to accommodate turning and rotating of mower 20. In yet other implementations, wheels 24 are not passive, but are actively controlled or steered by an operator.

Wheels 26 are located at a rear of mower 20. In the example illustrated, wheels 26 are rotatable about a single horizontal rotational axis 39. Wheels 26 are driven under power by integrated transaxles 36. In one implementation, wheels 26 have a diameter of at least 20 inches and nominally at least 23 inches. As will be described hereafter, this larger diameter of wheels 26 facilitates supporting of integrated transaxles 36 at a height which provides sufficient clearance for extending operator platform 40 below integrated transaxles 36. In other implementations, wheels 26 have other dimensions.

Cutting deck assembly 28 severs or cuts grass and other vegetation under power provided by prime mover 32. Cutting deck assembly 28 comprises cutting or mower deck 42 and at least one cutting blade 44 mounted undercutting deck 42 and rotatable under influence of prime mover 32. In one implementation, each cutting blade 44 receives power by a belt and pulley arrangement operably coupling such cutting blades 44 to prime mover 32. Although mower 20 is illustrated as comprising three cutting blades 44 and although cutting deck 28 is illustrated as having the illustrated shape encompassing or covering each of the three cutting blades 44, in other implementations, mower 20 has a single cutting blade 44, a pair of cutting blades 44 or more than three cutting blades 44. In other implementations, the layout of cutting blades 44 may be different from that illustrated. In other implementations, mower deck 42 may have other shapes.

Prime mover 32 comprises a device which produces torque to drive cutting blades 44 and integrated transaxles 36. In one implementation, prime mover 32 comprises an internal combustion engine supported by frame 22 and operably coupled to the pumps of integrated transaxles 36. In yet another implementation, prime mover 32 comprises an electrically powered device, such as electrically powered motor, operably coupled to the pumps of integrated transaxles 36.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Integrated transaxles 36 transmit torque from prime mover 32 to drive wheels 26. Integrated transaxles 36 facilitate independent powering or driving of drive wheels 26. In particular, each integrated transaxle 36 is capable of being rotated under power in forward and reverse directions independent of the other integrated transaxles 36 to facilitate forward, reverse and turning of mower 20. In the example illustrated, such wheels 26 may be independently driven of one another to provide "zero turn" capabilities for mower 20. Each integrated transaxle 36 comprises a hydraulic pump 48 and a hydraulic motor 50, each of which are contained within a single housing 52. Hydraulic pump 48 is operably coupled to prime mover 32 so as be driven by prime mover 32. Hydraulic pump 48 supplies hydraulic fluid under pressure to hydraulic motor 50 to drive hydraulic motor 50. The drive motor 50 is operably coupled to the associated wheel 26 to drive the associated wheel 26.

Figure 2:
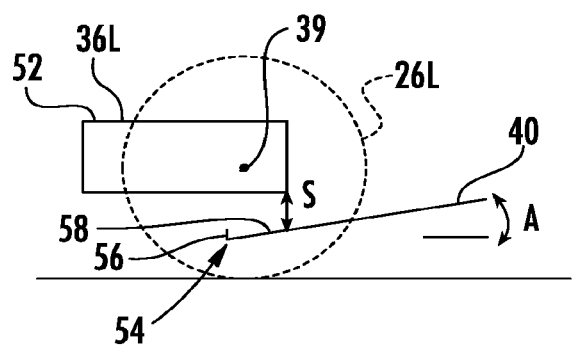
FIG. 2 is a side view of a portion of the mower of FIG. 1.

Operator platform 40 is located at a rear of mower 20 to support a standing operator of mower 20. In the example illustrated, platform 40 comprises a plate or panel at the rear of mower 20. Platform 40 extends at least partially beneath housing 52 of each of integrated transaxles 36L and 36R. As shown by FIG. 2, operator platform 40 has a front end 54 having a rim, lip or foot stop 56. In the example illustrated, foot stop 56 is located forward of rotational axis 39 directly beneath housing 52 of integrated transaxle 36L. In a similar fashion, foot stop 56 is also directly beneath housing 52 of integrated transaxle 36R as shown in FIG. 1. Those portions of operator platform 40 extending rearward of foot stop 56 are sufficiently spaced below lowermost surfaces of housing 52 such that the operator may position his or her feet upon platform 40 with his or her feet extending to foot stop 56 (the proportion of the feet contacting foot stop 56) without the top surfaces of the feet contacting housing 52 of either of integrated transaxles 36. In one implementation, operator platform 40 has an upper surface 58 directly underlying lower surface of housing 52 of transaxle 36L. In one implementation, the upper surface 58 is spaced from the lower surface of housing 52 by a spacing S of at least 2 inches.

Because operator platform 40 extends directly beneath, below and under housing 52 of integrated transaxles 36, platform 40 supports the operator at a position closer to axis 39 and closer to a center of mass of mower 20, which is at or forward axis 39. As a result, platform 40 provides greater stability. Because operator platform 40 extends directly beneath, below an outer housing 52 of integrated transaxles 36, operator platform 40 has a wider width. In the example illustrated, platform 40 extends directly beneath housing 52 across the majority of the transverse width W of each of housings 52 of integrated transaxles 36. In the example illustrated, platform 40 extends directly beneath housing 52 across substantially all of the transverse width W of each of housing 52 of integrated transaxles 36. As a result, platform 40 accommodates wider stances of an operator for further stability. In addition, platform 40 provides a wider transverse surface along which the operator may selectively position his or her feet to shift his or her weight, such as when mower 20 is tilted, such as when operating on a side of a hill.

As further shown by FIG. 2, in the example illustrated, platform 40 is supported such that upper surface 58 of platform 40 is inclined, sloping upward as upper surface 58 extends rearward of axis 39. As a result, upper surface 58 of platform 40 supports the operator in an orientation or at an angle in which the operator leans forward. Because platform 40 supports an operator at an inclination, the operator center mass or gravity is more in alignment with or closer to the center of mass of mower 20. As a result, platform 40 more stably supports the operator such that the operator avoids having the sensation that he or she is "hanging on" as a mower is driven forward. In the example illustrated, platform 40, when supporting an operator, is inclined (rearwardly extending upwardly) at an angle A relative to a horizontal plane. In one implementation, angle A is at least 10 degrees and nominally at least 15 degrees above the horizontal. For purposes of this disclosure, recited angles of any operator platform, such as platform 40 or platform 340, are in reference to the angle of the platform relative to horizontal when the mower itself is horizontal, i.e., when the mower is resting upon a level supporting surface and the tires are inflated such that the overall frame of the mower is supported in and extends in a horizontal plane.

FIGS. 3 and 4 illustrate mower 120, an example implementation of mower 20. Mower 120 is similar mower 20 except that mower 120 additionally comprises platform suspension system 124, suspension adjuster 126, position sensor 130 and parking brake and blade drive engager 134. Those remaining elements of mower 120 which correspond to corresponding elements of mower 20 are numbered similarly.

Suspension system 124 (schematically shown in FIG. 4) resiliently supports platform 44 movement as mower 20 encounters bumps and the like to reduce shock and vibration upon the operator. In the example illustrated, platform 40 is pivotally supported about a pivot axis 138 proximate the forward end 54 of platform 40. In the example illustrated, platform 40 pivots between a fully raised position 142 (shown in broken lines) and a lowered position 144. Platform 40 is resiliently supported at the raised position 142 in the absence of an operator upon platform 40. Platform 40 is resiliently supported at the lowered position in the presence of an operator, wherein the way to the operator pivots platform 42 the lowered position. Pivot axis 138 transversely extends directly beneath housing 52 of each of transaxles 36. In the example illustrated, pivot axis 138 extends directly beneath or forward drive axis 39.

In one implementation, suspension system 124 comprises tension springs suspending platform 40 from portions of frame 22 about platform 40. Such tension spring support platform 40 in the fully raised position in the absence of an operator. In another implementation, suspension system 124 comprises compression springs captured between platform 40 and portions of frame 22 below platform 40. Such compression springs support platform 40 in the fully raised position 142 in the absence of an operator upon platform 40. In yet other implementations, suspension system 124 comprises a combination of tension springs and compression springs.

Suspension adjuster 126 comprises a mechanism or device that adjusts the spring or springs resiliently supporting platform 40 so as to adjust the resistance against movement from the raised position 142 toward the lowered position 144 provided by such spring or springs. In one implementation, suspension adjuster 126 comprises a first threaded member connected to an end of a tension spring and wherein the threaded member is rotatable with respect to a second threaded member secured to frame 22, wherein relative rotation of the two threaded members adjusts the position of the tension spring to adjust the amount of resistance applied by the tension spring against resilient movement of platform 40 from the fully raised position 142 toward the lowered position 144. For example, in one implementation, each tension spring supporting platform 40 has an end secured to an eye bolt, wherein the eye bolt is secured to platform 22 by a nut or internally threaded member such that rotation of the nut or rotation the eye bolt moves the positioning of the end of the tension spring to adjust the supported height of platform 40 in the absence of an operator and the resistance provided by the tension spring. In other implementations, suspension adjuster 126 may have other configurations.

Position sensor 130 (schematically shown) comprises a sensor that senses or detects positioning of operator platform 40. In one implementation, position sensor 130 outputs electrical signals which are transmitted to electronic circuitry of parking brake and blade drive engager 134. In one implementation, position sensor 130 comprises a contact switch which detects when operator platform 40 has resiliently pivoted to a predefined raised position 144, presumably in the absence of an operator. In yet another implementation, position sensor 130 comprises a potentiometer operably coupled to platform 40 so to output different electrical signals based upon which position, of a plurality of available positions, that operator platform 40 presently resides. In yet other implementations, position sensor 130 may comprise other types of sensing device that output electrical signal indicating the position of operator platform 40.

In yet another implementation, position sensor 130 comprises a mechanical linkage operably connecting operator platform 40 to transmit a mechanical force to parking brake and blade engager 134. For example, in one implementation, position sensor 130 comprises a Bowden cable having a first end operably coupled to platform 40 and a second end connected to parking brake and blade drive engager 134. In such an implementation, movement of platform 40 pushes or pulls upon the Bowden cable such that an operational state of parking brake and blade drive engager 134 is adjusted or changed.

Parking brake and blade drive engager 134 utilizes signals or mechanical force received from position sensor 130 to engage or disengage a single or pair of parking brakes 150 and one of more blade drives 152 (shown in FIG. 3). Parking brakes 150 retain or resist motion of wheels 26. When engaged, blade drive 152 transmits torque from prime mover 32 to blades 44 to rotate blades 44. When disengaged, blade drive 152 disconnects blades 44 from prime mover 32 to inhibit the driving of blades 44. In one implementation, blade drive 152 comprises a clutch or other selectable transmission component.

Engager 134 comprises a controller, such as the control board or electronic circuitry, that, based upon the positioning of operator platform 40, engages or disengages parking brake 150 and blade drive 152. In response to operator platform 40 moving or pivoting to the fully raised position, indicating the absence of an operator, engager 134 automatically engages parking brake 150 and automatically disengages blade drive 152. At the same time, prime mover 32 continues to operate or run, avoiding the need of having to be restarted to resume use of mower 120. In one implementation, in response to the positioning of operator platform 40 moving or pivoting to the lowered position from the fully raised position, engager 134 automatically disengages parking brake 150 and automatically engages blade drive 152, allowing immediate resumption of the use of mower 120 once the operator remount platform 40. In yet another implementation, once the operator has the mounted platform 40 resulting in parking brake 150 being engaged in blade drive 152 being disengaged, remounting of platform 40 by the operator does not automatically disengage parking brake 150 and/or automatically reengage blade drive 152. In such an implementation, additional confirming action or input from the operator is required to disengage parking brake 150 and/or reengage blade drive 152.

FIG. 5 is a flow diagram of an example method 200 for the operation of mower 120. As indicated by block 202, the position of platform 40 is sensed. As indicated by block 204, based on the sensed position of platform 40, engager 134 automatically engages or disengages each of the parking brake 150 and blade drive 152. As noted above, in one implementation, the parking brake 150 is automatically engaged or the blade drive 152 is automatically disengaged in response to platform 40 pivoting or moving to the fully raised position, wherein the movement of platform 40 is sensed and/or the final position of platform 40 in the fully raised position is sensed.

Figure 6:
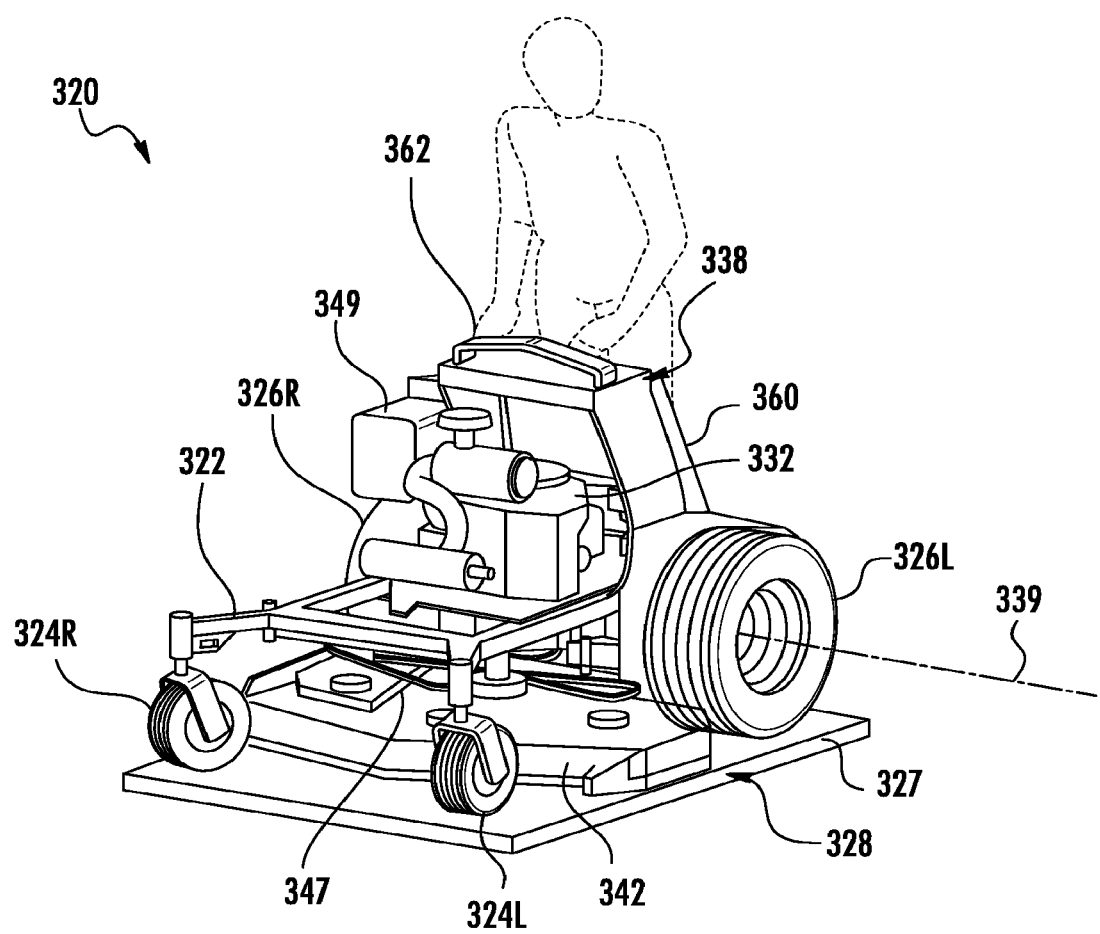
FIG. 6 is a front perspective view of another example mower mounted by an example operator.
Figure 7:
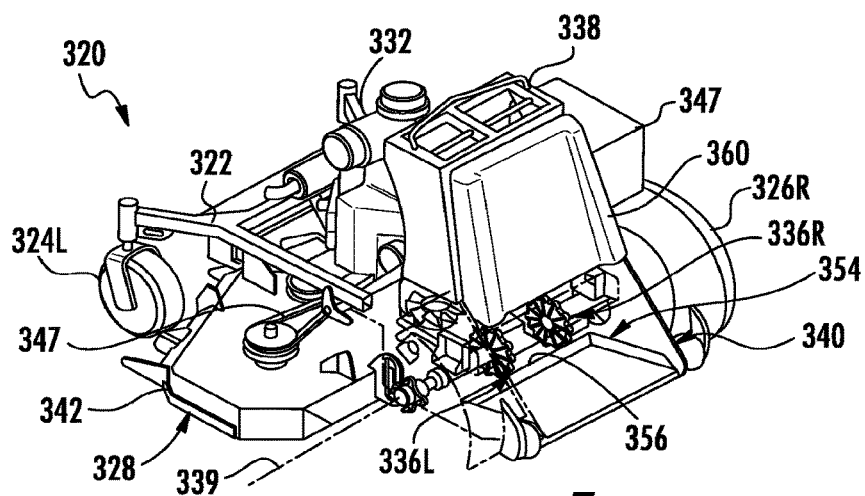
FIG. 7 is a rear perspective view of the mower of FIG. 6 with portions transparently shown.
Figure 8:
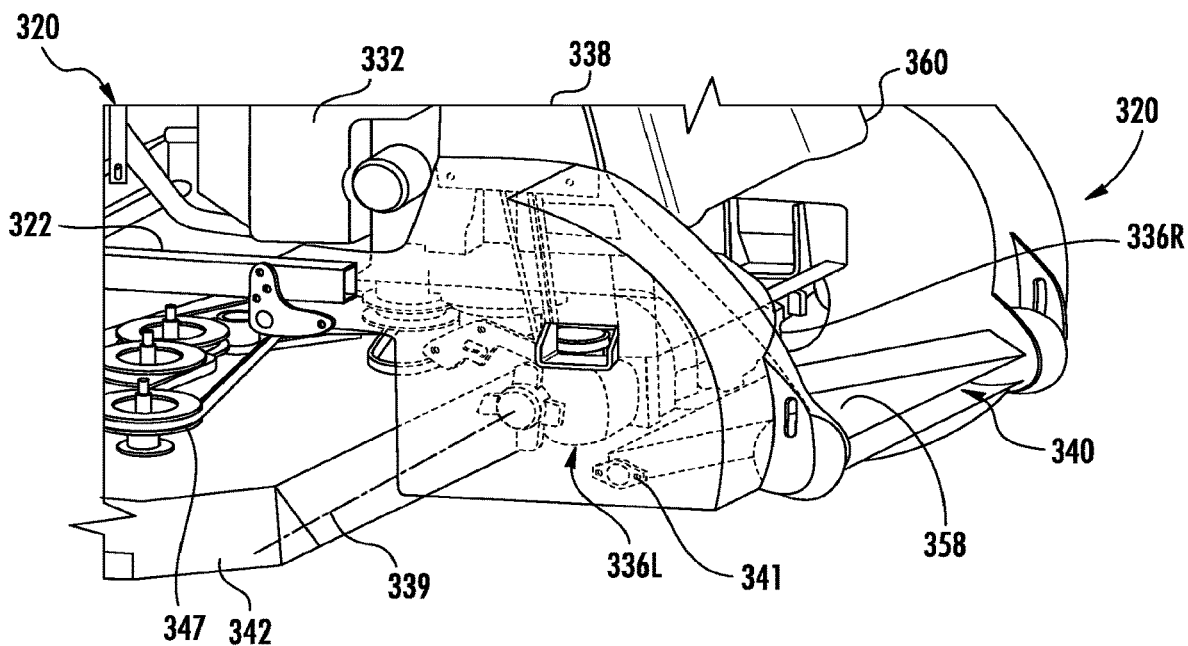
FIG. 8 is an enlarged rear perspective view of the mower of FIG. 6 with portions transparently shown.
Figure 9:
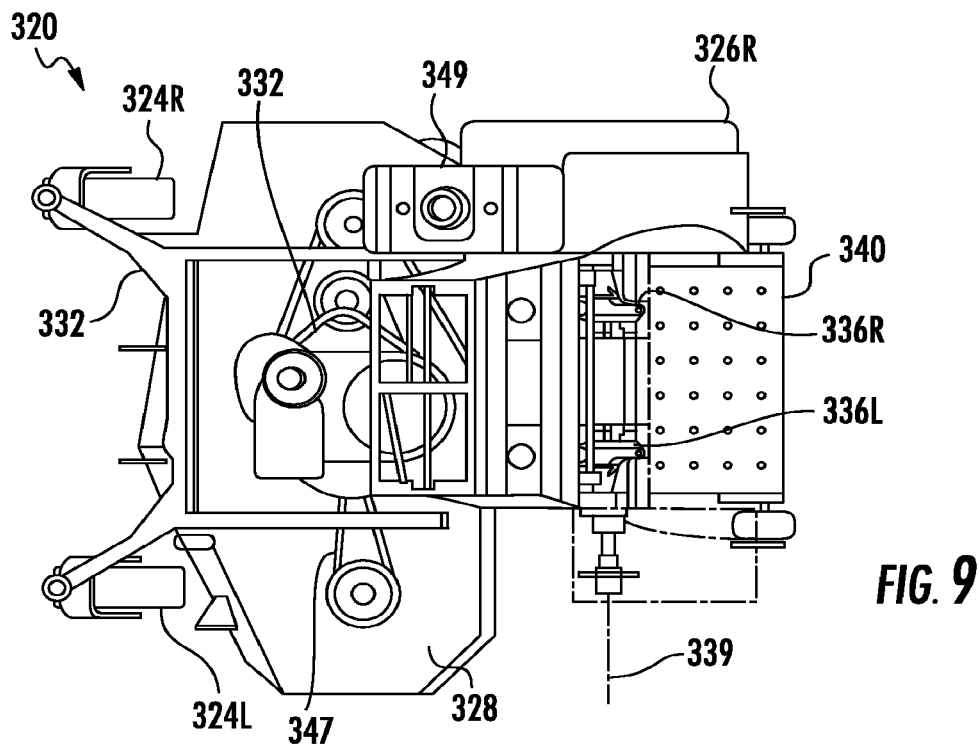
FIG. 9 is a top view of the mower of FIG. 6 with portions transparently shown.

FIGS. 6-17 illustrate mower 320, an example implementation of mower 120. As shown by FIGS. 6 and 7, mower 320 comprises frame 322, left and right front wheels 324L and 324R (collectively referred to as wheels 324), left and right drive wheels 326L, 326R (collectively referred to as wheels 326), cutting deck assembly 328, prime mover 332, left side and right side integrated transaxles 336L, 336R (collectively referred to as integrated transaxles 336), control tower 338 and operator platform 340. Frame 22 comprises a platform or framework supported by wheels 324, 326 above ground or terrain 327. Frame 322 supports the remaining components of mower 320.

Wheels 324 extend at a forward end of mower 320. In the example illustrated, wheels 324 are passive, not driven under power. In one implementation, wheels 324 comprise caster wheels, being able to swivel with respect to frame 322 about vertical axes to accommodate turning and rotating of mower 320. In yet other implementations, wheels 324 are not passive, but are actively controlled or steered by an operator.

Wheels 326 are located at a rear of mower 320. In the example illustrated, wheels 326 rotatable about a single horizontal rotational axis 339. Wheels 326 are driven under power by integrated transaxles 336. In one implementation, wheels 326 have a diameter of at least 20 inches and nominally at least 23 inches. As will be described hereafter, this larger diameter of wheels 326 facilitates supporting of integrated transaxles 336 at a height which provides sufficient clearance for extending operator platform 340 at least partially below integrated transaxles 336. In other implementations, wheels 326 have other dimensions.

Figure 16:
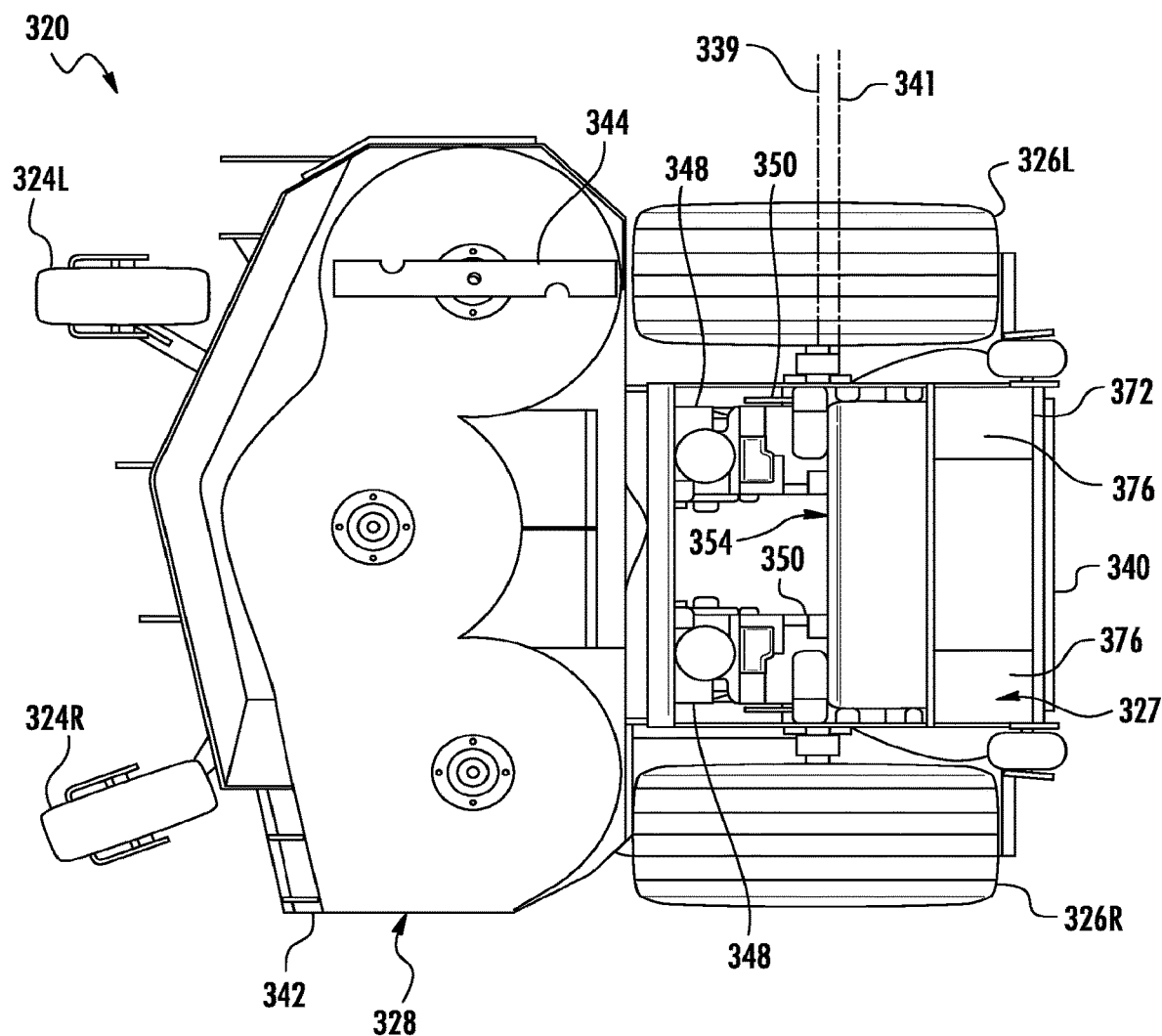
FIG. 16 is a bottom view of the mower of FIG. 6.

Cutting deck assembly 328 severs or cuts grass and other vegetation under power provided by prime mover 332. Cutting deck assembly 328 comprises cutting or mower deck 342 and at least one cutting blade 344 (one of which is shown in FIG. 16) mounted under cutting deck 342 and rotatable under influence of prime mover 332. In the illustrated example, each cutting blade 344 receives power by a belt and pulley arrangement 347 operably coupling such cutting blades 44 to prime mover 332. Although mower 320 is illustrated as comprising three cutting blades 344 and although mower deck 342 is illustrated as having the illustrated shape encompassing or covering each of the three cutting blades 344, in other implementations, mower 320 has a single cutting blade 344, a pair of cutting blades 344 or more than three cutting blades 344. In other implementations, the layout of cutting blades 344 may be different from that illustrated. In other implementations, mower deck 342 may have other shapes.

Prime mover 332 comprises a device which produces torque to drive cutting blades 344 and integrated transaxles 336. In the example illustrated, prime mover 332 comprises an internal combustion engine supported by frame 322 and operably coupled to the pumps of integrated transaxles 336. Prime mover 332 receives fuel from fuel tank 349. In yet another implementation, prime mover 332 comprises an electrically powered device, such as electrically powered motor operably coupled to the pumps of integrated transaxles 336.

Integrated transaxles 336 are driven under the influence of prime mover 332 to drive wheels 326. For purposes of this disclosure, an "integrated transaxle" refers to a pump, a motor and a hydraulic system contained within a single housing or multiple housings joined adjacent to one another, wherein the housing or housings enclose a pump input shaft and a motor output shaft extending through the housing or housings such that the integrated transaxle is a modular, self-contained and independent unit. Integrated transaxles 336 facilitate independent powering or driving of drive wheels 326. In particular, each integrated transaxle 336 is capable of being rotated under power in forward and reverse directions independent of the other integrated transaxle 336 to facilitate forward, reverse and turning of mower 320. In the example illustrated, such wheels 326 may be independently driven of one another in opposite directions to provide "zero turn" capabilities for mower 320.

Figure 10:
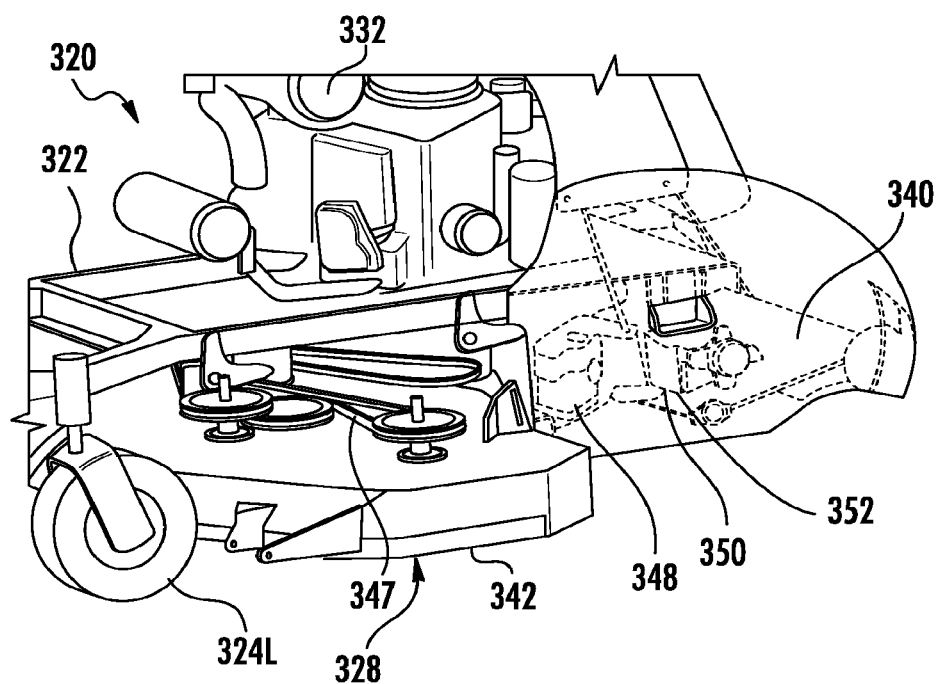
FIG. 10 is a perspective view of the mower of FIG. 6 with portions transparently shown.
Figure 11:
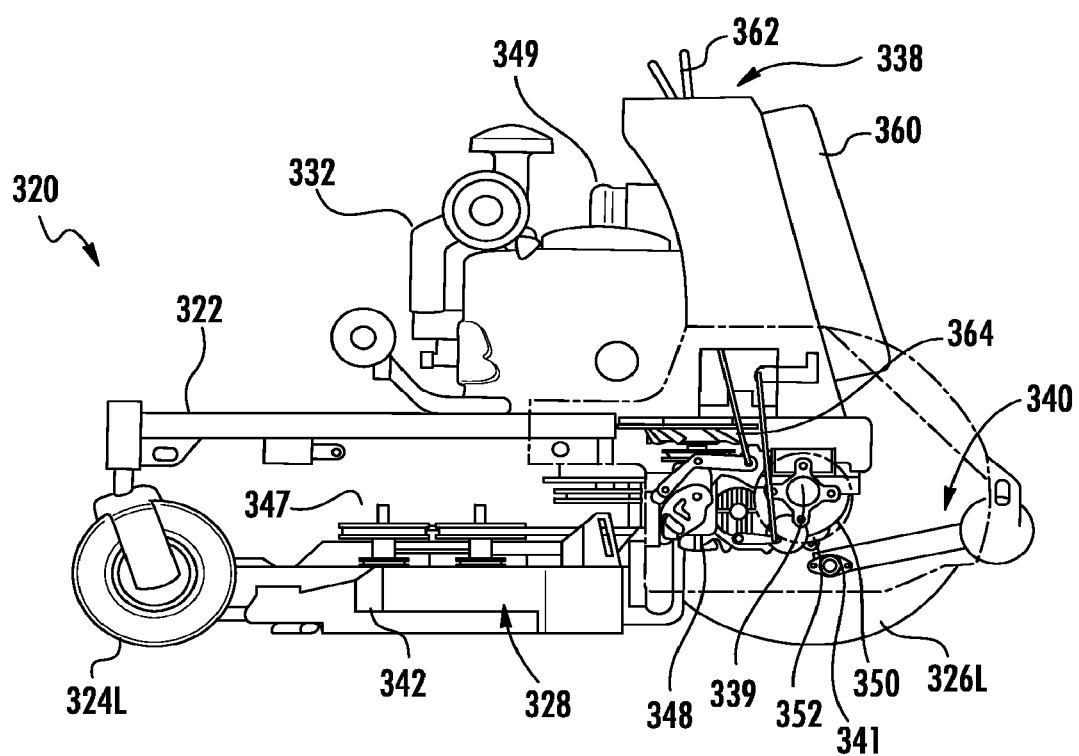
FIG. 11 is a side view of the mower of FIG. 6 with portions transparently shown.
Figure 12:
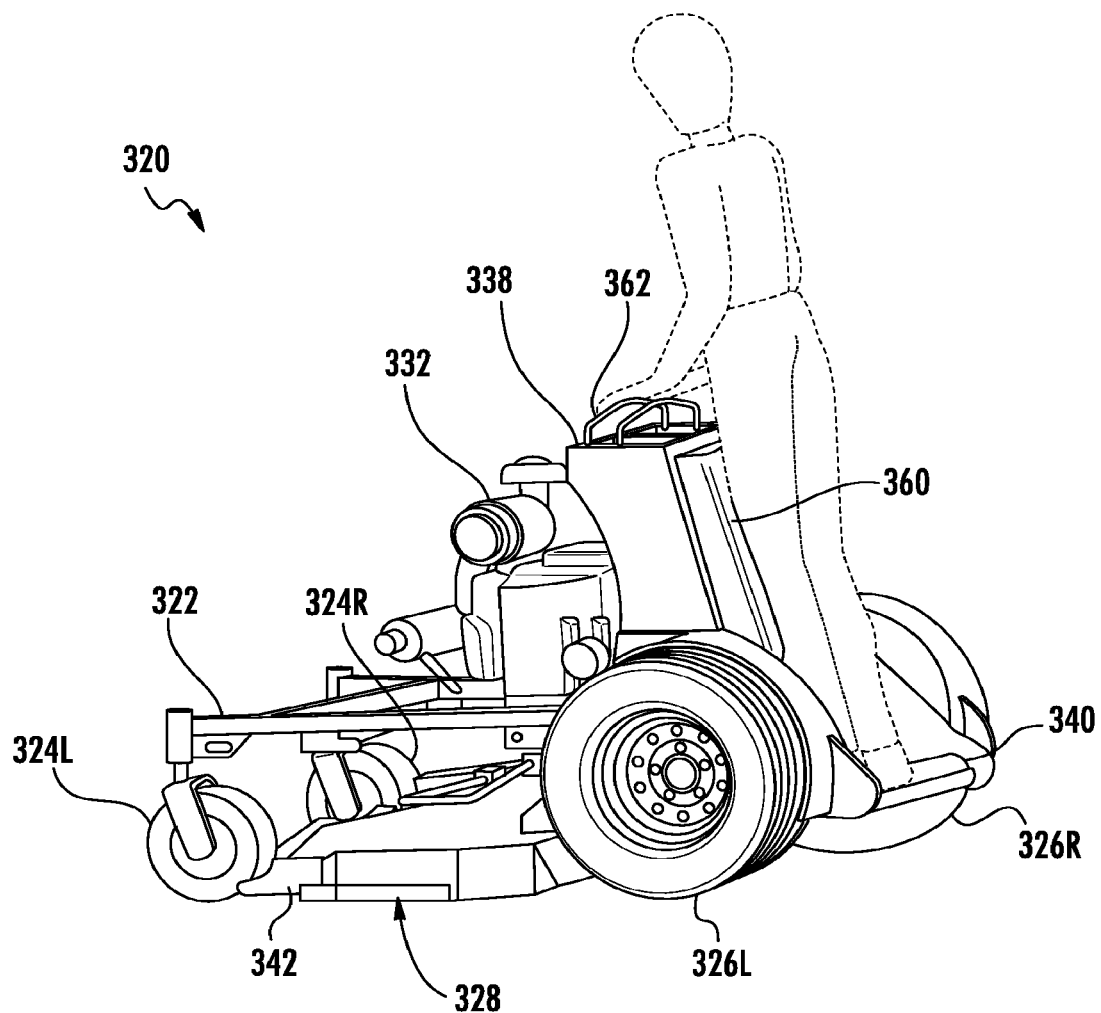
FIG. 12 is a rear perspective view of the mower of FIG. 6 mounted by the example operator.

As illustrated in FIGS. 10 and 11, each integrated transaxle 336 comprises a hydraulic pump 348 and a hydraulic motor 350, each of which are contained within a single housing 352. Hydraulic pump 348 is operably coupled to prime mover 332 so as be driven by prime mover 332. Hydraulic pump 348 supplies hydraulic fluid under pressure to hydraulic motor 350 to drive hydraulic motor 350. In one implementation, hydraulic pump 348 includes a swash plate (not shown) that is movable to cause hydraulic fluid to flow in forward or reverse directions through drive motor 350. The drive motor 350 is operably coupled to the associated wheel 326 to drive the associated wheel 326. In the example illustrated, integrated transaxles 336 are self-contained and do not mix hydraulic fluid or share a reservoir.

Control tower 338 rises vertically from frame 322 rearward of prime mover 332. Control tower 338 comprises operator support 360 manual controls 362 and drive transmission 364. Operator support 360 comprises a panel, such as a cushion, forwardly inclined above operator platform 40. Operator support 360 provides a surface against which an operator, when standing upon platform 340, may rest and lean against.

Manual controls 362 comprise levers, buttons or other input devices by which an operator controls the operation of mower 320. A portion of manual controls 362 are operably coupled to drive transmission 364 through linkages, cables and the like. Actuation of manual controls 362 adjusts the state of drive transmission 364 to selectively vary independent driving of wheels 326 by integrated transaxles 336. For example, actuation manual controls 362 controls the rate at which hydraulic fluid is supplied by pump 348 to the associated motor 350 and the direction, through adjustment of the swash plate, that the hydraulic fluid drives motor 350 to control the speed and rotational direction at which wheels 326 are independently driven.

Operator platform 340 is located at a rear of mower 320 to support a standing operator of mower 320. In the example illustrated, platform 340 comprises a plate or panel at the rear of mower 320. As shown in FIG. 11, platform 340 extends beneath housing 352 of each of integrated transaxles 336L and 336R.

For purposes of this disclosure, the term "front" and variations thereon shall mean positioned further in the forward direction and an element being compared. The term "reverse" and variations thereon shall mean in a direction parallel to the direction from the front wheels 24, 324 toward the rear wheels 26, 326. The term "rear" and variations thereon shall mean position further in the reverse direction than an element being compared. The terms "right," "left," and variations thereon shall be in reference to the respective right left is viewed by forward-looking operator. The terms "up," "down" and variations thereof to be used as from the perspective of an operator standing on the operator platform 40, 340. The terms "above" and "over" shall mean intersecting a comparatively higher horizontal plane. The terms "directly above" and "directly over" shall mean intersecting a comparatively higher horizontal plane and intersecting a common vertical line. The terms "below" and "under" shall mean intersecting a comparatively lower horizontal plane. The terms "directly below", "directly under" and "directly beneath" shall mean intersecting a comparatively lower horizontal plane and intersecting a common vertical line. Elements that are "directly above" or "directly below" other elements are also "above" or "below" the other elements, but the opposite is not necessarily true.

Figure 14:
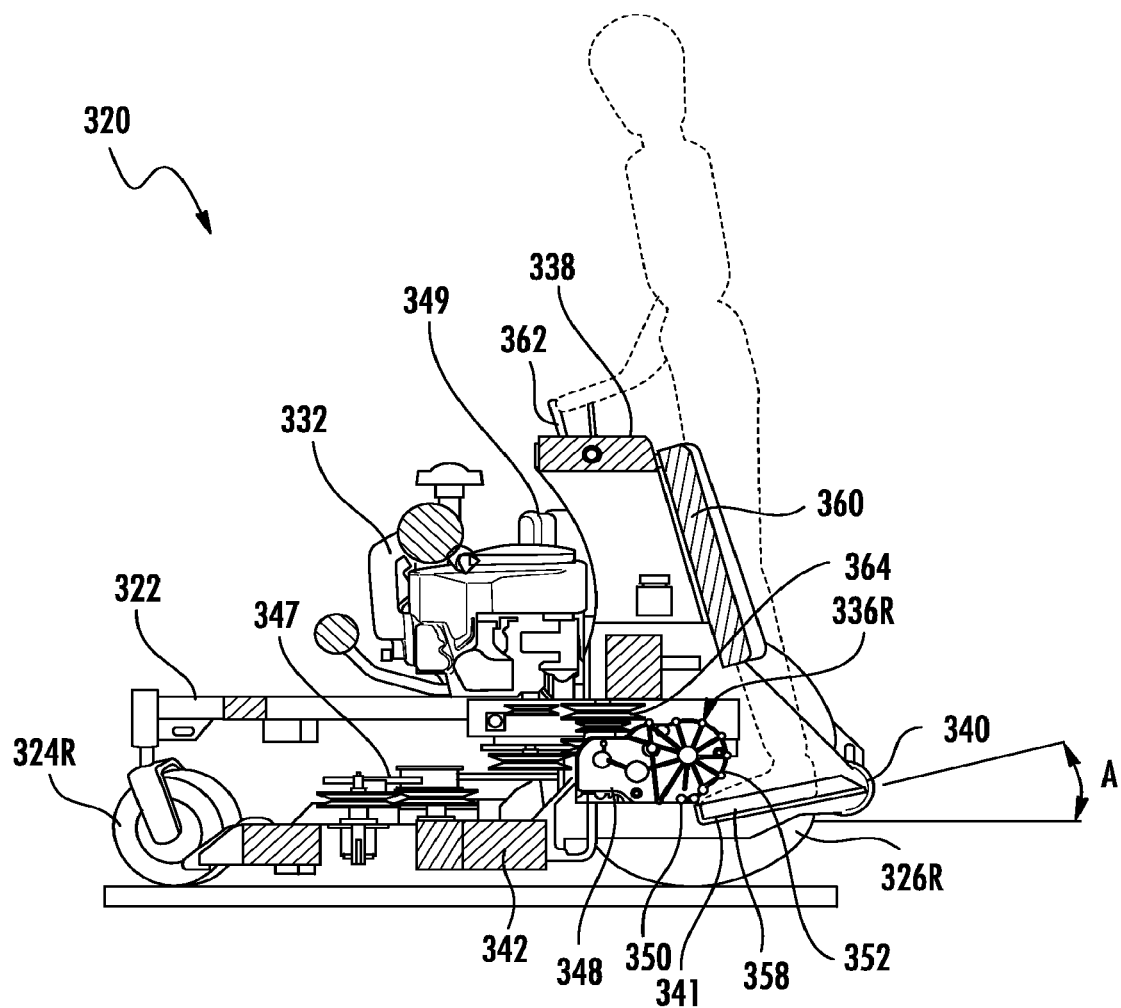
FIG. 14 is a sectional view of the mower and operator of FIG. 6.

As shown by FIG. 7, operator platform 340 has a front end 354 having a rim, lip or foot stop 356. In the example illustrated, foot stop 356 is located forward of rotational axis 339 directly beneath housing 352 of integrated transaxle 336L. In a similar fashion, foot stop 356 is also substantially directly beneath housing 352 of integrated transaxle 336R. Those portions of operator platform 340 extending rearward of foot stop 356 are sufficiently spaced below lowermost surfaces of housing 352 such that the operator may position his or her feet upon platform 340 with his or her feet extending to foot stop 356 (the toe or shoe tip portions of the feet contacting foot stop 356) without the top surfaces of the feet contacting housing 352 of either of integrated transaxles 336. In other implementations, a pad or cushion layer is mounted below the bottom surface of integrated transaxles 336, wherein the top of the operator's feet contact the cushion layer or layers, but are spaced from the bottom surface of housing 352 of each of the integrated transaxles 336. As shown by FIG. 14, operator platform 340 has an upper surface 358 directly underlying lower surface of housing 352 of transaxle 336L. In one implementation, the upper surface 358 adjacent foot stop 356 is spaced from the lower surface of housing 352 by a spacing of at least 6 inches.

Figure 13:
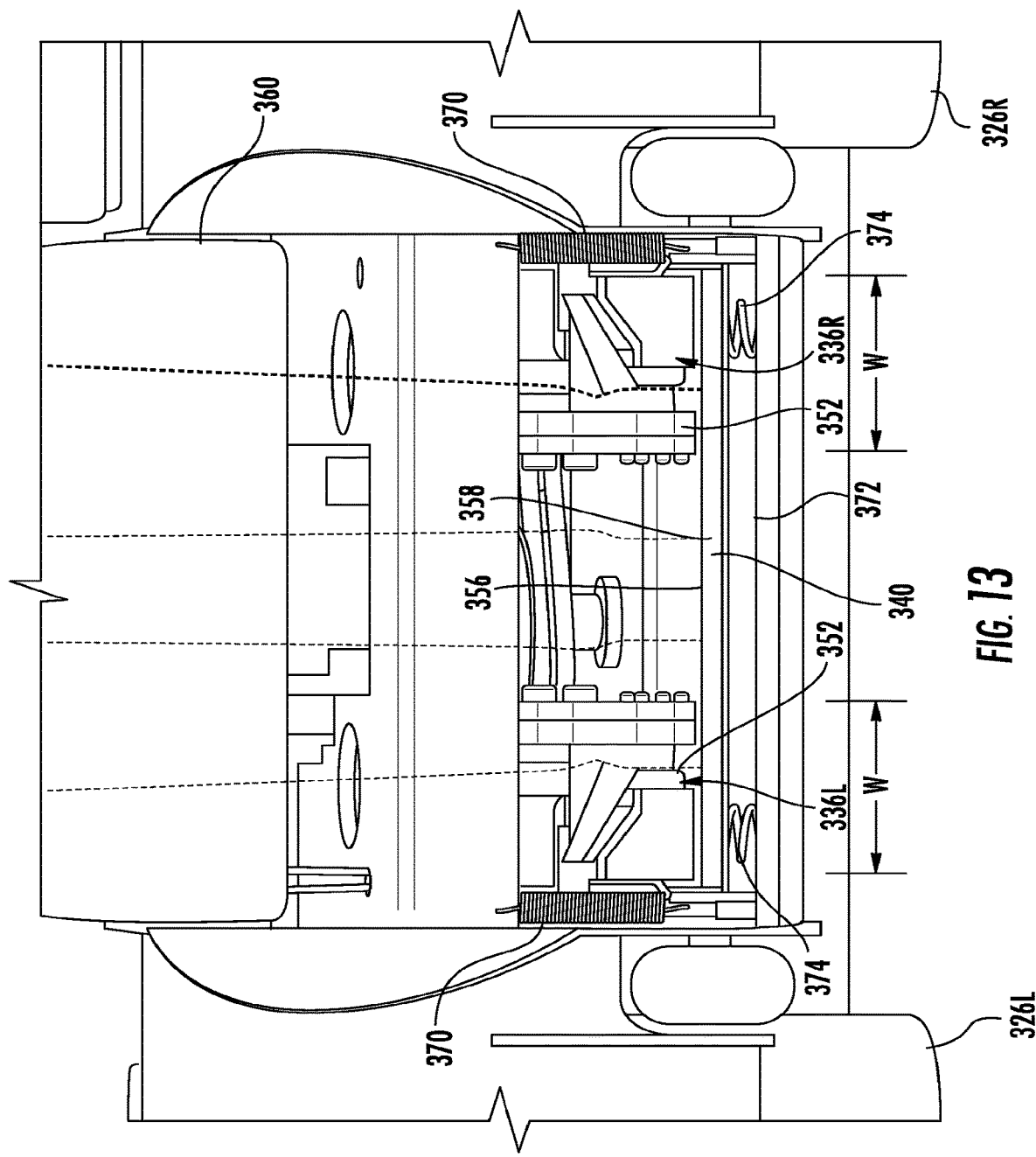
FIG. 13 is a rear view of the mower of FIG. 6 with the example operator being transparently shown.
Figure 17:
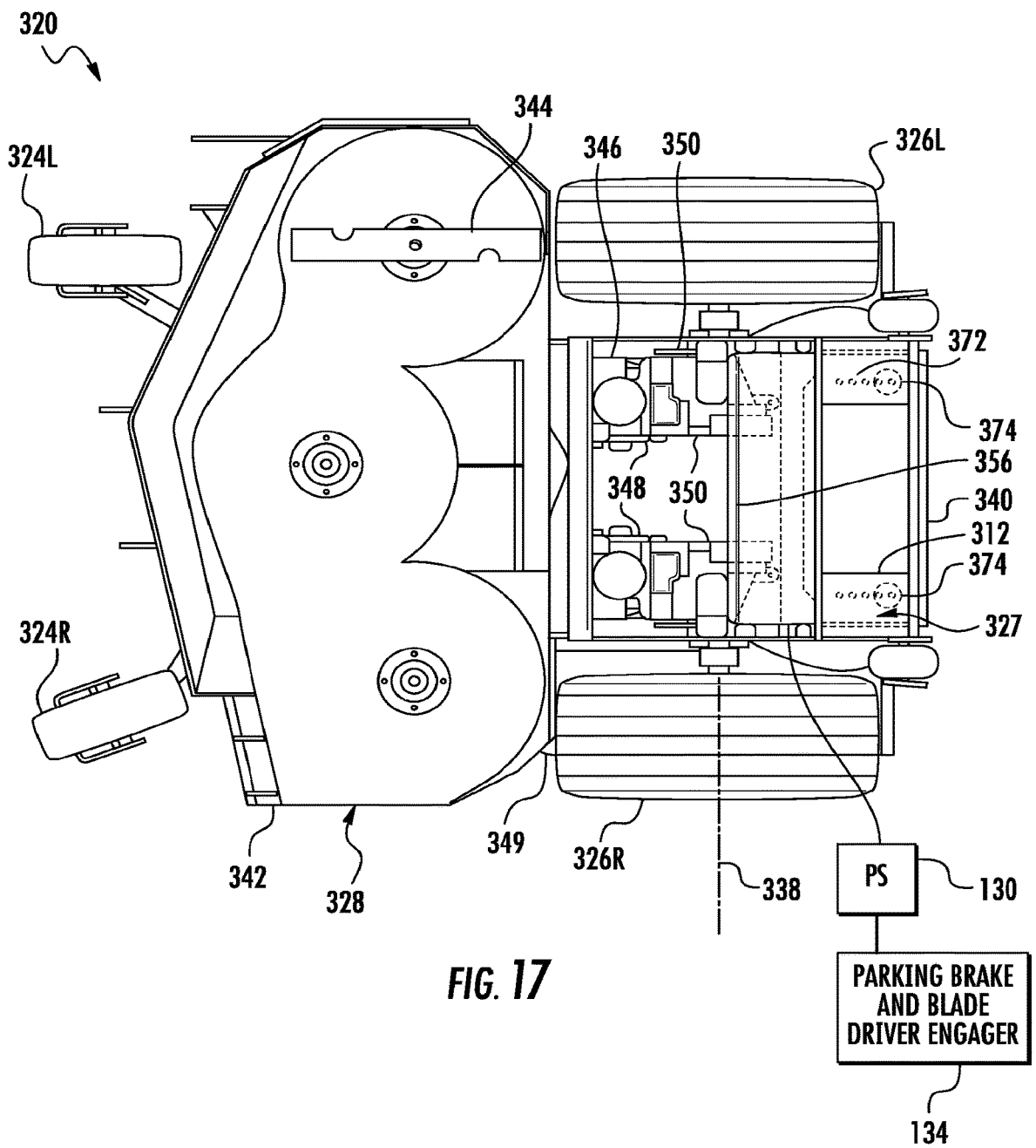
FIG. 17 is a bottom view of the mower FIG. 6 with portions transparently shown.

As shown by FIGS. 12-15, because operator platform 340 extends directly beneath, below and under housing 352 of integrated transaxles 336, platform 340 supports the operator at a position closer to axis 339 and closer to a center of mass of mower 320, which is at or forward axis 339. As a result, platform 340 provides greater stability. Because operator platform 340 extends directly beneath, below an outer surface of housing 352 of integrated transaxles 336, operator platform 340 has a wider width. As shown by FIG. 13 and as shown by FIG. 17 which transparently illustrates platform 340 from a bottom of mower 320, platform 340 extends directly beneath housing 352 across the majority of the transverse width W of each of housings 352 of integrated transaxles 336. In the example illustrated, platform 340 extends directly beneath housing 352 across substantially all of the transverse width W of each of housing 352 of integrated transaxles 336. As a result, platform 340 accommodates wider stances of an operator for further stability. In addition, platform 340 provides a wider transverse surface along which the operator may selectively position his or her feet to shift his or her weight, such as when mower 320 is tilted, such as when operating on a side of a hill.

In one implementation, wherein mower 320 has a wheel track, the distance between the transverse center of the left drive wheel 26L to the transverse center of the right drive wheel 26R, platform 340 has a transverse width of at least 55% of the wheel track and nominally at least 60% of the wheel track. For example, in one implementation, mower 320 comprises a 52 inch cutting swath mower having a wheel track of 34.8 inches and a platform 340 having a transverse width of 21 inches. In yet another implementation, mower 320 comprises a 62 inch cutting swath mower having a wheel track of 43 inches and a platform having a transverse width of at least 24 inches.

Figure 15:
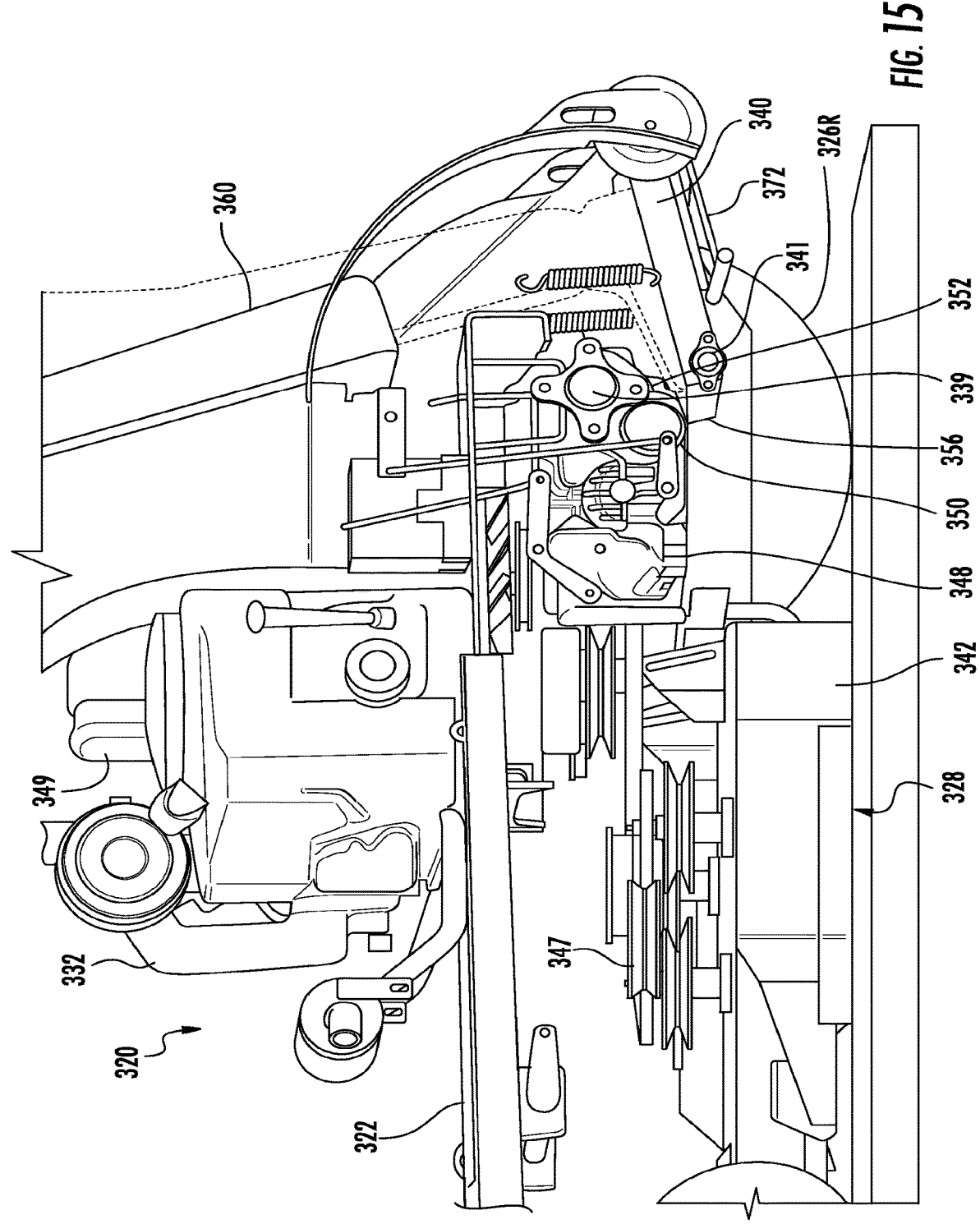
FIG. 15 is an enlarged rear perspective view of the mower and operator of FIG. 6 with portions omitted.

As further shown by FIGS. 14 and 15, in the example illustrated, platform 340 is supported such that upper surface 358 of platform 340 is inclined, sloping upward as upper surface 358 extends rearward of axis 339. As a result, upper surface 358 of platform 340 supports the operator in an orientation or at an angle in which the operator leans forward. Because platform 340 supports an operator at an inclination, the operator center mass or gravity is more in alignment with or closer to the center of mass of mower 320. As a result, platform 340 more stably supports the operator such that the operator does not have the sensation that he or she is "hanging on" as a mower is driven forward. In the example illustrated, platform 340, when supporting an operator, is inclined at an angle A relative to a horizontal plane. In one implementation, angle A is at least 10 degrees and nominally at least 15 degrees above the horizontal.

Although platform 340 is illustrated as a single continuous platform that accommodates both feet of an operator, in other implementations, platform 340 alternatively comprises a pair of spaced footpads, a left foot pad for the left foot of the operator and a right foot pad for the right foot of the operator. Although operator platform 340 is illustrated as comprising foot stop 356, in other implementations, foot stop 356 is omitted. Although platform 340 is illustrated as having a substantially planar or flat upper surface 358, in other implementations, platform 340 comprises ridges, dimples, ribbing or other surface structures having high levels of friction for being gripped by the feet of the operator. Although operator platform 340 is illustrated as being inclined or tilted to support the operator in a leaning forward orientation, in other implementations, operator platform 340 alternatively extends in a horizontal plane or is inclined in the rearward direction at other angles.

As shown by FIGS. 13 and 16-17, mower 120 additionally comprises platform suspension system 324, suspension adjuster 327, position sensor 330 and parking brake and blade drive engager 134. Suspension system 324 resiliently supports platform 44 movement as mower 20 encounters bumps and the like to reduce shock and vibration upon the operator. In the example illustrated, platform 340 is pivotally supported about a pivot axis 341 proximate the forward end 354 of platform 340. In the example illustrated, platform 340 pivots between a fully raised position and a lowered position. Platform 340 is resiliently supported at the raised position in the absence of an operator upon platform 340. Platform 340 is resiliently supported at the lowered position in the presence of an operator, wherein the way to the operator pivots platform 340 to the lowered position. As shown by FIG. 17 which transparently illustrates portions of mower 320, pivot axis 341 transversely extends directly beneath housing 352 of each of transaxles 336. In the example illustrated, pivot axis 341 extends just rearward (within 2 inches) of forward drive axis 39.

As shown by FIG. 13, suspension system 124 comprises resilient suspenders 370, support panel 372 and resilient supports 374. Resilient suspenders 370 suspend platform 40 from portions of frame 22 about platform 340. Such resilient suspenders support platform 340 in the fully raised position in the absence of an operator. In the example illustrated, resilient suspenders 370 comprise tension springs. In other implementations, resilient suspenders 370 alternatively comprise resiliently stretchable or elastomeric straps, bands or cables.

Support panel 372 comprises a panel support by frame 22 below platform 340. Support panel 372 contacts or abuts a lower surface of platform 340 when platform 340 has completely "bottomed out". Support panel 372 further supports resilient supports 374. In the example illustrated, resilient supports 374 comprise compression springs. In other implementations, resilient supports 374 comprise rubber, rubber-like or elastomeric resilient bumpers that resiliently bend or resiliently compress in response to receiving a load from platform 340. As shown by FIG. 17 which transparently illustrates support panel 372, resilient supports 374 are captured between support panel 372 and an underside of platform 340.

In another implementation, platform 340 is a resiliently supported in a raised inclined orientation by torsion spring having a first end portion secured to platform 340 and a second end portion secured to the rest of the mower, such as support panel 372. Pivotal movement of platform 340 about its pivot axis, in response to receiving a load upon platform 340, moves platform 340 against a torsional bias provided by the torsion spring.

Suspension adjuster 327 comprises a mechanism or device that adjusts the suspenders and supports resiliently supporting platform 340 so as to adjust the resistance against movement from the raised position toward the lowered position provided by such supports 374. In the example illustrated, suspension adjuster 327 comprises a series of mounting locations 376, each mounting location 376 being differently spaced with respect to pivot axis 341 of platform 340. Suspension adjuster 306 allows the positioning of supports 374 to be mounted at a selected one of the different mounting locations 376 to vary a lever arm between pivot axis 341 and the supports 374 so as to adjust the resistance provided by supports 374.

In the example illustrated, each mounting location 376 comprises an aperture extending through support platform 372. Each aperture is sized to receive a bolt having a head which captures a washer against the lowest coil of the associated compression spring serving as support 374. A nut (not shown) retains the bolt in place in the selected aperture at the selected mounting location 376. In other implementations, each mounting location 376 may comprise other retention mechanisms or devices for releasably retaining or securing each of supports 374 at a selected one of the mounting locations 376.

In other implementations, suspension adjuster 126 may have other configurations. For example, in implementations in which supports 374 additionally or alternatively comprise a torsion spring, suspension adjuster 126 additionally or alternatively comprises one or more different locations for mounting the first end portion or the second end portion of the torsion spring to adjust the degree or extent of torsional resistance that the spring provides against rotation of platform 340 about its pivot axis. In one implementation, portions of the frame of the mower, such as platform support 372, include a series of apertures, wherein an end portion of the torsion spring may be selectively mounted or secured within one of the apertures to vary a degree of torsional resistance provided by torsion spring 374 against pivotal movement of platform 340.

As described above, position sensor 130 (schematically shown) comprises a sensor that senses or detects positioning of operator platform 340. In one implementation, position sensor 130 output electrical signals which are transmitted to electronic circuitry of parking brake and blade drive engager 134. In one implementation, position sensor 130 comprises a contact switch which detects when operator platform 340 has resiliently pivoted to a predefined lowered position, presumably in the presence of an operator. In yet another implementation, position sensor 130 comprises a potentiometer operably coupled to platform 340 so to output different electrical signals based upon which position, of a plurality of available positions, that operator platform 340 presently resides. In yet other implementations, position sensor 130 may comprise other types of sensing device that output electrical signal indicating the position of operator platform 340.

In yet another implementation, position sensor 130 comprises a mechanical linkage operably connecting operator platform 340 to transmit a mechanical force to parking brake and blade engager 134. For example, in one implementation, position sensor 130 comprises a Bowden cable having a first end operably coupled to platform 340 and a second end connected to parking brake and blade drive engager 134. In such an implementation, movement of platform 340 pushes or pulls upon the Bowden cable such that an operational state of parking brake and blade drive engager 134 is adjusted or changed.

Parking brake and blade drive engager 134 utilizes signals or mechanical force received from position sensor 130 to engage or disengage a single or pair of parking brakes 150 and one of more blade drives 152 (shown in FIG. 3). Parking brakes 150 retain or resist motion of wheels 326. When engaged, blade drive 152 transmits torque from prime mover 332 to blades 344 to rotate blades 344. When disengaged, blade drive 152 disconnects blades 344 from prime mover 332 to inhibit the driving of blades 344. In one implementation, blade drive 152 comprises a clutch or other selectable transmission component.

Engager 134 comprises a controller, such as the control board or electronic circuitry that, based upon the positioning of operator platform 340, engages or disengages parking brake 150 and blade drive 152. In response to operator platform 340 moving or pivoting to the fully raised position, indicating the absence of an operator, engager 134 automatically engages parking brake 150 and automatically disengages blade drive 152. At the same time, prime mover 332 continues to operate or run, avoiding the need of having to be restarted to resume use of mower 320. In one implementation, in response to the positioning of operator platform 340 moving or pivoting to the lowered position from the fully raised position, engager 134 automatically disengages parking brake 150 and automatically engages blade drive 152, allowing immediate resumption of the use of mower 120 once the operator remount platform 340. In yet another implementation, once the operator has the mounted platform 340 resulting in parking brake 150 being engaged in blade drive 152 being disengaged, remounting of platform 340 by the operator does not automatically disengages parking brake 150 and/or automatically reengage blade drive 152. In such an implementation, additional confirming action or input from the operator is required to disengage parking brake 150 and/or reengage blade drive 152.

Figure 18:
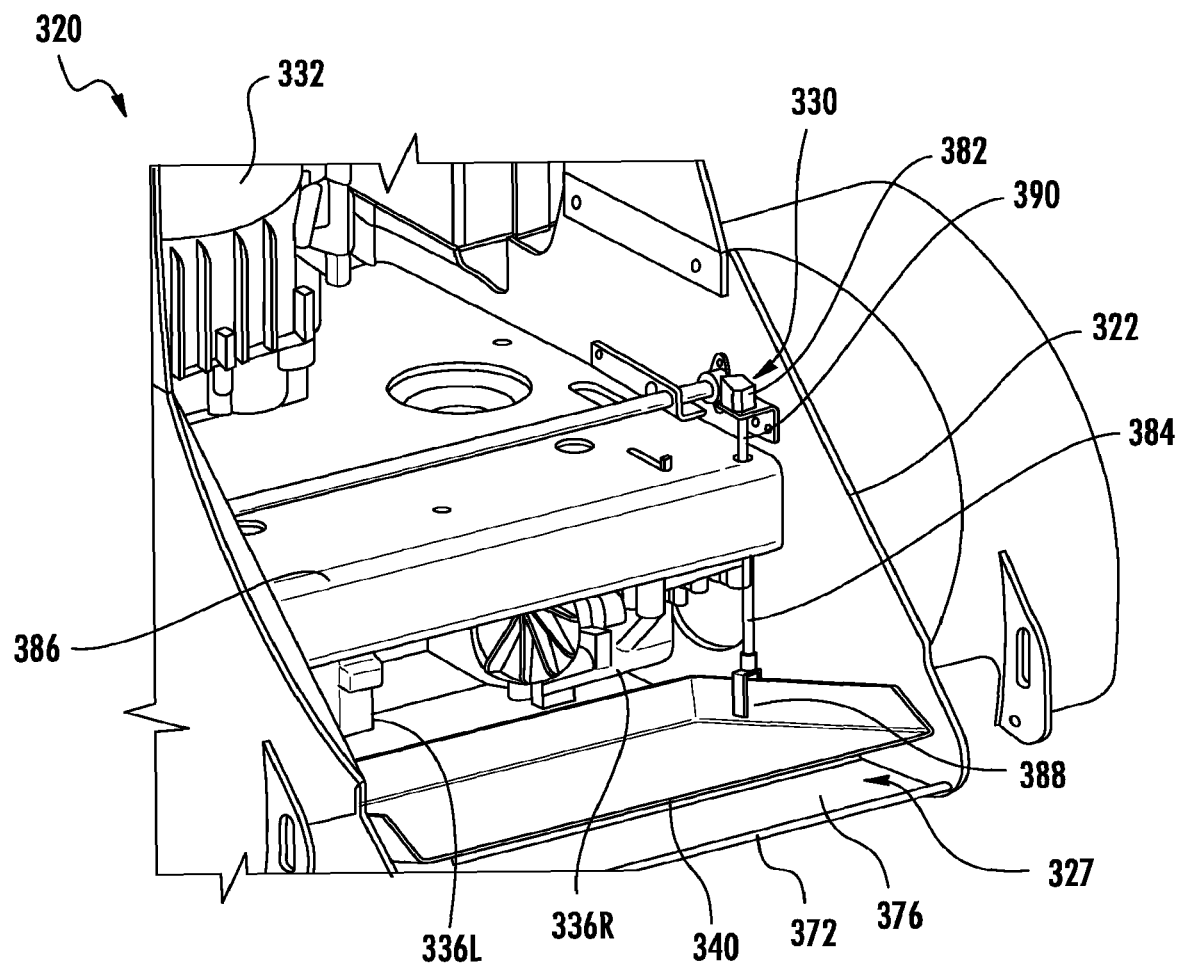
FIG. 18 is a fragmentary rear perspective view of the mower of FIG. 6 comprising a specific implementation of an operator platform position sensor.

FIG. 18 is a fragmentary rear perspective view of the mower 320 comprising operator platform position sensor 330, a particular implementation of position sensor 130. As shown by FIG. 18, position sensor 330 comprises switch 382 and switch actuation linkage 384. Switch 382 comprises an electrical contact switch actuatable between a closed state and an open state based upon a position of operator platform 340. In the example illustrated, switch 382 is mounted to frame 322 above engine support platform 386 of frame 322. Based upon the position of switch 382, illogical signals are transmitted to parking brake and blade drive engager 134 (described above). In other implementations, switch 382 comprises other sensing devices such as a photo inventor-detector sensor or potentiometer.

Switch actuation linkage 384 comprises a rod having a first end 388 pivotably coupled to operator platform 340 and a second end 390 connected to switch 382 to actuate switch 382. In the example illustrated, linkage 384 passes through engine support platform 386 between platform 340 and 382. As a result, switch 32 is contained within frame 322 and is shielded from vegetation and other environmental conditions by platform 386.

In operation, platform 340 is resiliently biased to a fully raised position by suspension 324, such as by tension spring 370 (shown in FIG. 13). In the fully raised position, linkage 384 interacts with switch 382 such that switch 32 is held in one of an open or closed state, indicating to engager 134 at platform 340 is in the fully raised position and that an operator is not present upon platform 340. When an operator mounts platform 340, platform 340 pivots to a lowered position. Pivoting of platform 340 to the lowered position results in linkage 384 being pulled downward such that switch 32 is actuated to the other of the open or closed state, indicating to engager 134 that platform 340 is no longer in the fully raised position and that the operator is present upon platform 340. As noted above, engager 134 automatically actuates parking brake 150 and automatically disengages brake drive 152 in response to signals (or a lack thereof) indicating that an operator is no longer present upon platform 340. In one implementation, engager 134 automatically disengages parking brake 150 and/or automatically engages brake drive 152 in response to signals (or lack thereof) indicating that an operator is once again present upon platform 340. In other implementations, signals (or lack thereof) from switch 32 are used to additionally automatically enable, engage or disengage other operational components of mower 320.

Although each of the above described integrated transaxles is disclosed as having its own dedicated housing, wherein the platform extends at least partially beneath each of the two housings of the two integrated transaxles, in other implementations, the left and right integrated transaxles are contained within a single housing. In such an implementation, the platform extends at least partially beneath the single housing. In yet other implementations, individual components of each integrated transaxle are housed or contained within multiple separate housings, wherein the platform extends at least partially beneath at least one of the multiple housings of each of the integrated transaxles.

Figure 19:
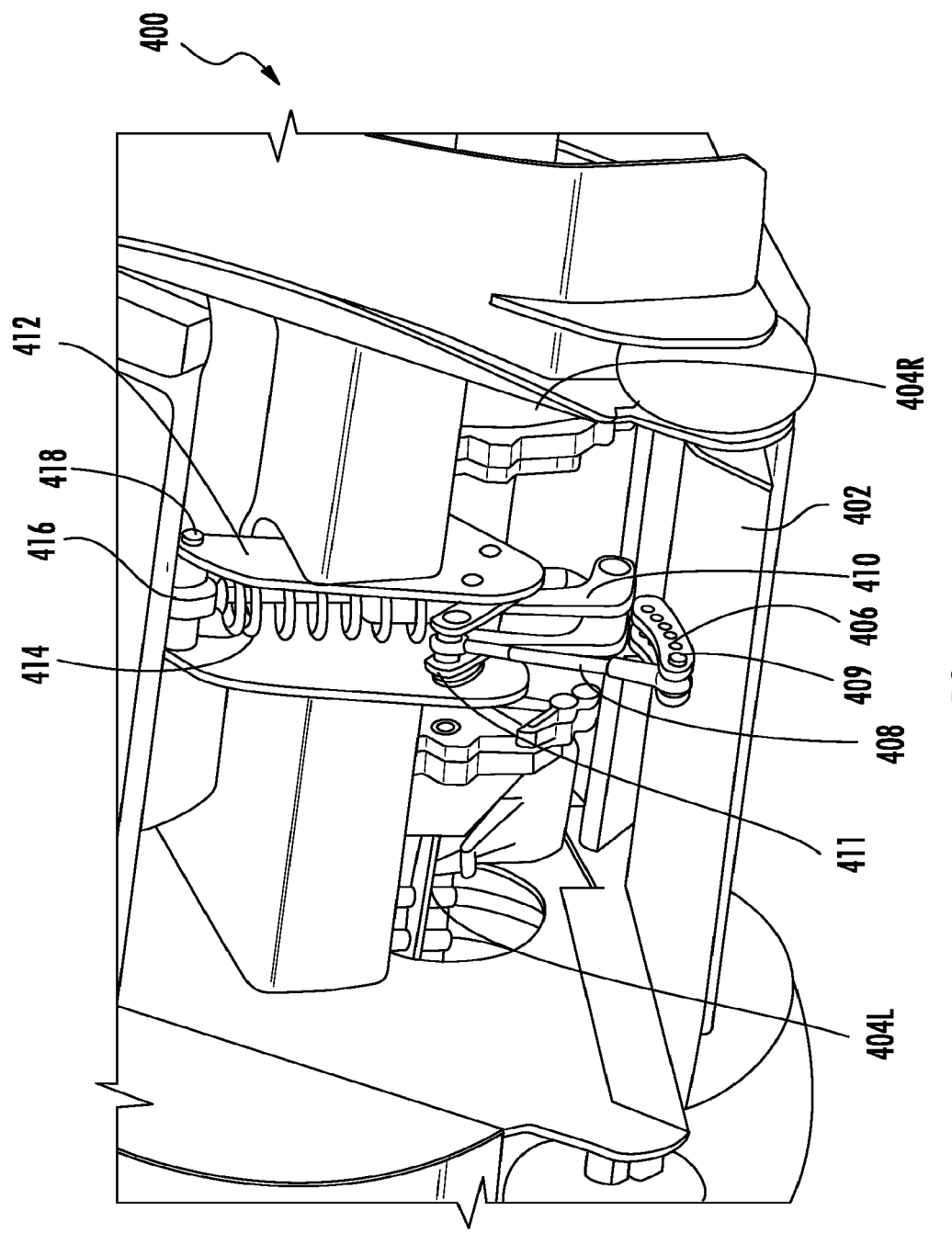
FIG. 19 is a partial rear perspective view of a mower having a suspended platform in accordance with another exemplary embodiment.
Figure 20:
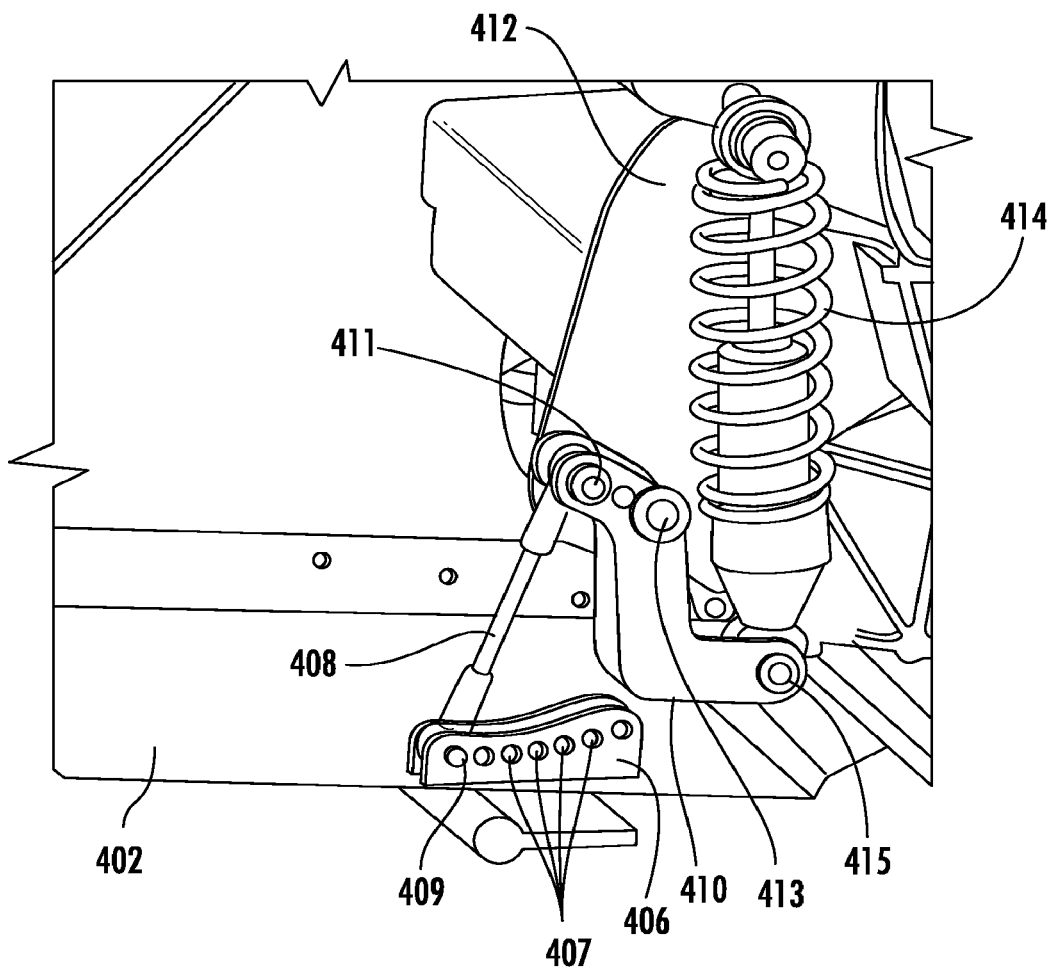
FIG. 20 is a partial side view of a mower having a suspended platform in accordance with another exemplary embodiment.

Next, referring to FIGS. 19-22, an operator platform and associated suspension system for a stand-on lawnmower 400 having an example suspension adjuster in accordance with another exemplary embodiment is shown. FIG. 19 shows a platform 402 pivotally supported at one end at least partially below respective left and right integrated transaxles 404L, 404R. Mounted on platform 402 is a two piece suspension adjustment plate 406 configured to retain a first end of a suspension adjustment linkage 408. Suspension adjustment plate 406 is preferably mounted to platform 402 via welding, but may be mounted in any suitable way (e.g., fasteners) or integrally formed with platform 402. Suspension adjustment linkage 408 is coupled to suspension adjustment plate 406 via a pin 409, which is preferably toollessly removable via, e.g., a clevis pin.

Suspension adjustment linkage 408 is pivotally coupled at a second end 411 to a suspension link 410. Suspension link 410 itself is pivotally coupled to a fixed bracket 412 at a pivot 413 that is mounted to a portion of the frame of mower 400, as is more clearly shown in FIG. 20. A suspension device 414, e.g. a coil-over-shock device, is pivotally mounted to suspension link 410 at a pivot 415, and is further pivotally coupled via a bushing 416 to bracket 412, wherein bracket 412 holds a pin 418 which also pivotally supports bushing 416. Suspension device 414 may be any suitable device for providing shock absorption to platform 402.

Figure 21:
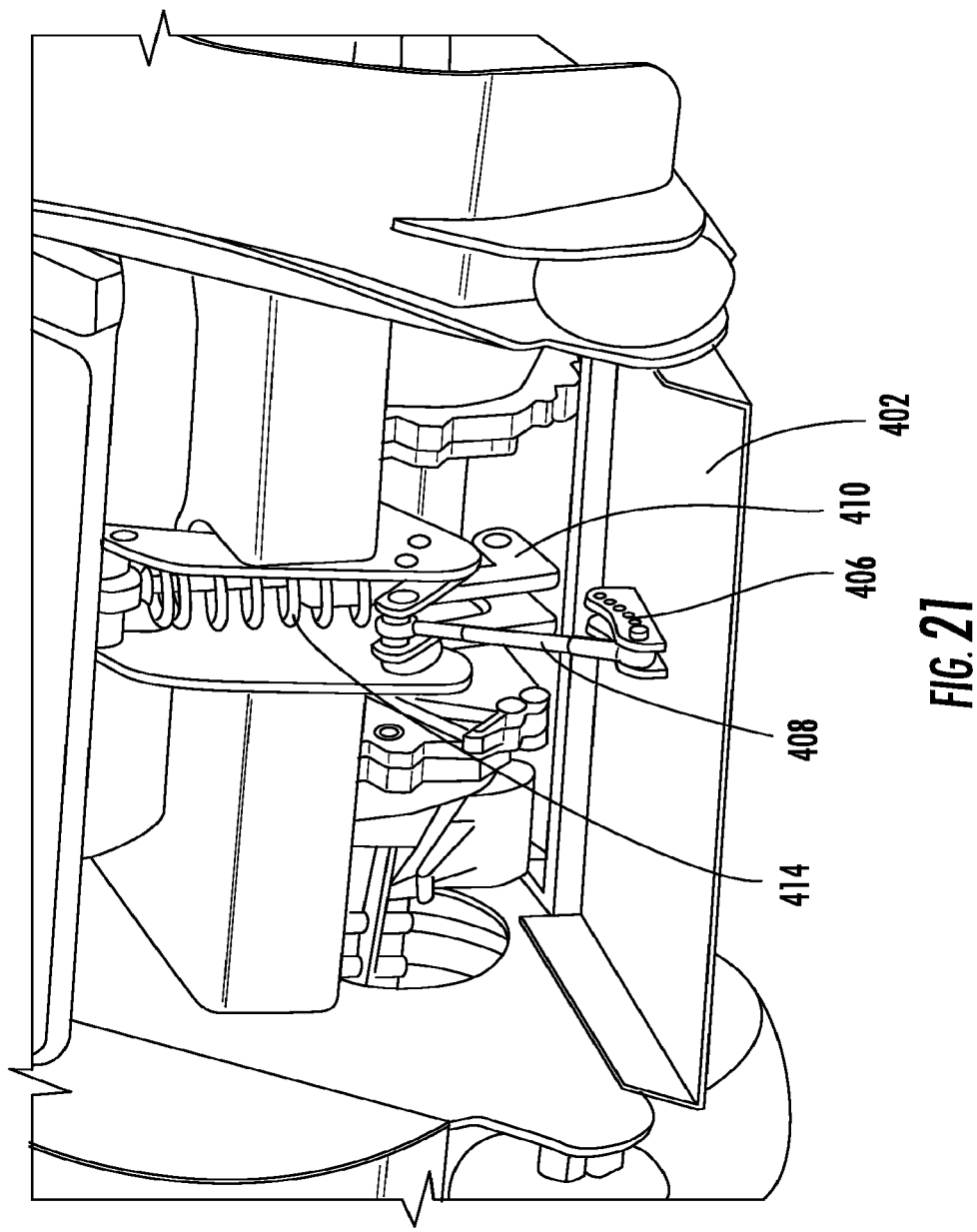
FIG. 21 is another partial rear perspective view of a mower having a suspended platform in accordance with another exemplary embodiment.
Figure 22:
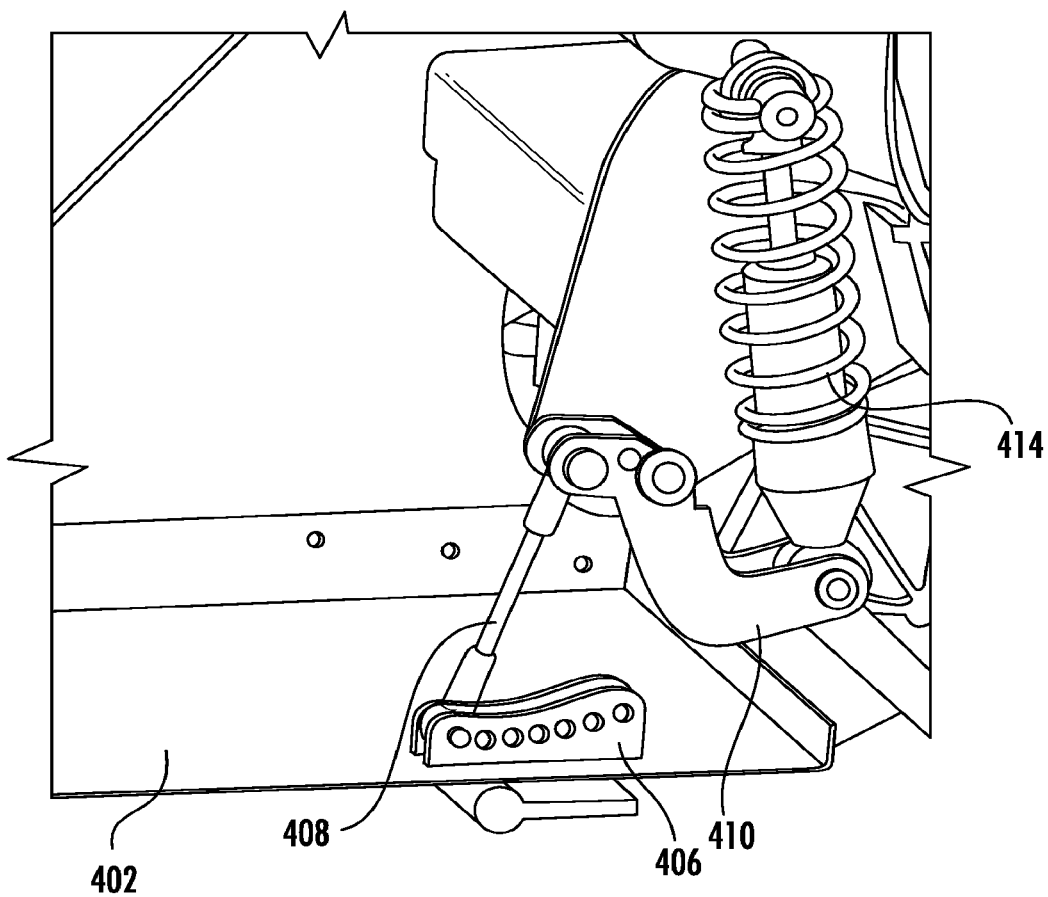
FIG. 22 is another partial side view of a mower having a suspended platform in accordance with another exemplary embodiment.

When the user steps onto platform 402 to begin operating mower 400, their feet are positioned on either side of suspension adjustment plate 406. The weight of the operator causes an initial compression of suspension device 414, as can be seen in FIGS. 21 and 22. Due to varying weights of different operators of mower 400, it is preferable for the platform suspension system to be adjustable to account for such weight variations. Accordingly, suspension adjustment plate 406 contains a plurality of holes 407, wherein each hole 407 is configured to accept pin 409. In this way, the compliance of platform 402 can be altered by simply changing the position of pin 409 in suspension adjustment plate 406. In the position shown in FIGS. 19-22, suspension adjustment linkage 408 is positioned at the "stiffest" setting, wherein platform 402 provides the most coil-over-shock suspension device 414 travel, which is particularly advantageous for heavier operators or others who prefer less platform travel. As suspension adjustment linkage 408 and pin 409 are moved to other holes 407 in suspension adjustment plate 406 that are closer to the pivot point of platform 402, coil-over-shock suspension device 414 travel decreases, making the suspension more compliant for lighter operators. The farther coil-over-shock suspension device 414 travels, the more force it applies to supporting the platform.

Figure 23:
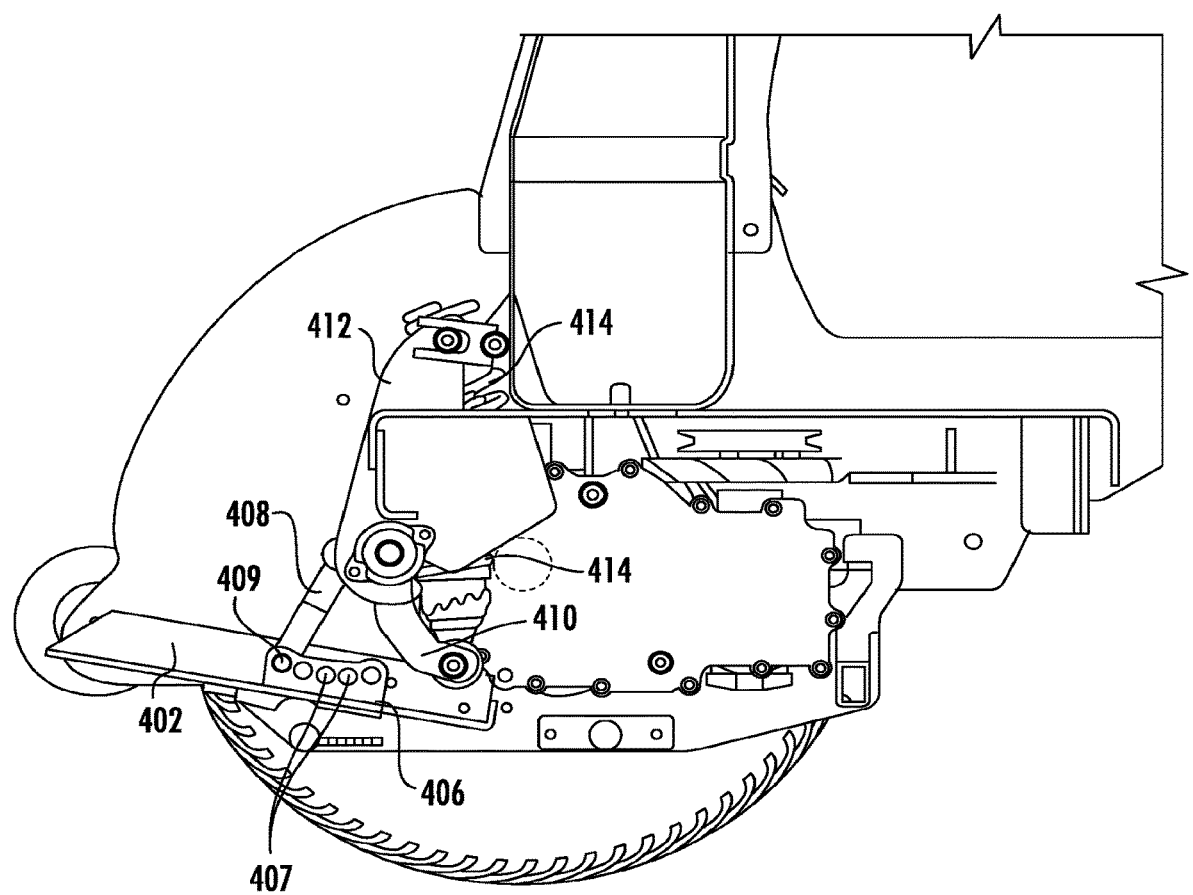
FIG. 23 is another partial side view of a mower having a suspended platform in accordance with another exemplary embodiment.
Figure 24:
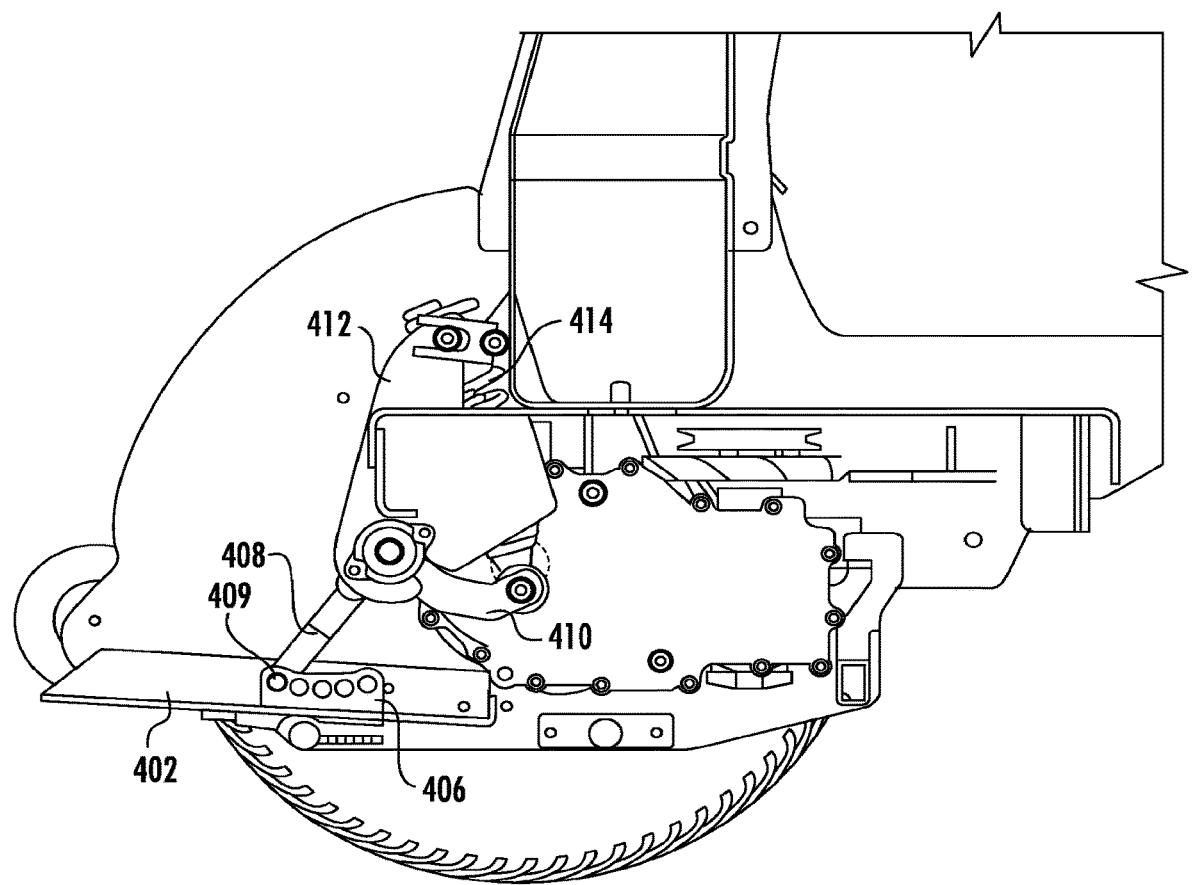
FIG. 24 is another partial side view of a mower having a suspended platform in accordance with another exemplary embodiment.

Referring to FIGS. 23-26, additional partial side views of mower 400 are illustrated. FIG. 23 shows platform 402 in its uncompressed state (i.e., no operator present), wherein suspension adjustment linkage 408 is set at the "stiffest" setting in suspension adjustment plate 406. FIG. 24 depicts platform 402 with a hypothetical user present. As can be seen in FIG. 24, the presence of an operator on platform 402 causes suspension link 410 to rotate, which in turn can more fully compress suspension device 414 and cause platform 402 to rotate into an increasingly horizontal position relative to its initial angle to better support a heavier operator.

Figure 25:
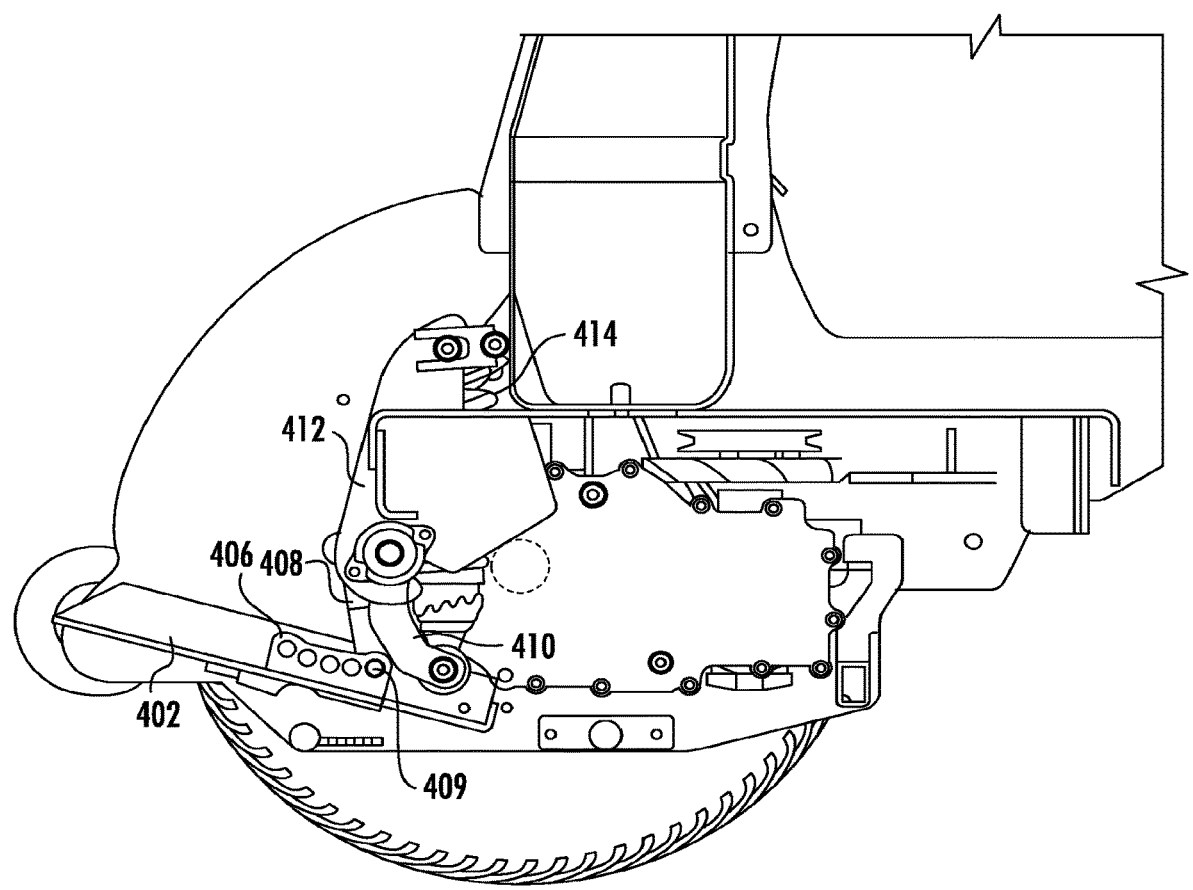
FIG. 25 is another partial side view of a mower having a suspended platform in accordance with another exemplary embodiment.
Figure 26:
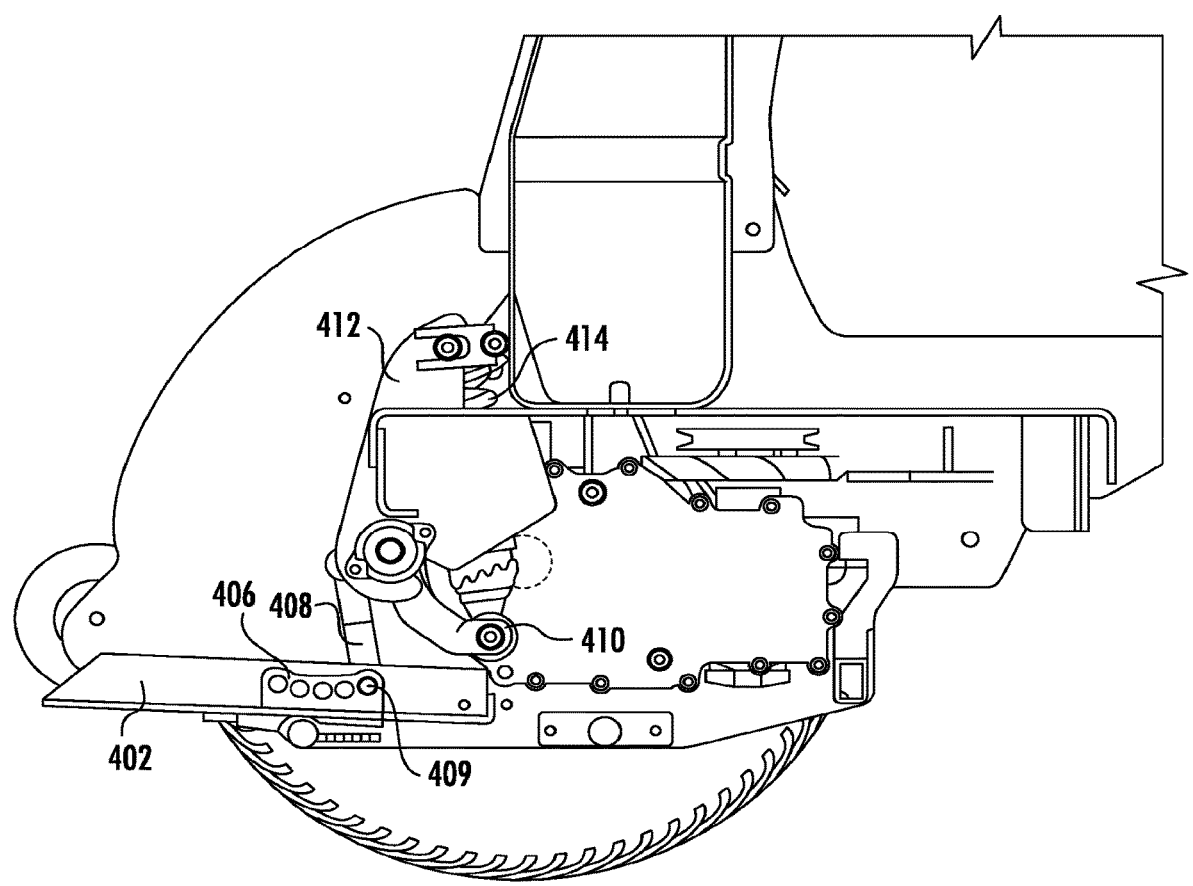
FIG. 26 is another partial side view of a mower having a suspended platform in accordance with another exemplary embodiment.

FIGS. 25 and 26, on the other hand, depict views of platform 402 with suspension adjustment linkage 408 set at the "lightest" setting. This reduces the potential travel of suspension device 414 and allows for greater overall angular movement of platform 402 for the lighter operator, as can be seen in FIG. 26, which shows platform 402 having a hypothetical operator thereon and depicting the increased angular movement of platform 402. Accordingly, an operator who is heavier or prefers more suspension travel may choose to position suspension adjustment linkage 408 at a hole 407 farther from the pivot point of platform 402, while a lighter operator may choose to position suspension adjustment linkage 408 at a hole 407 closer to the pivot point of platform 402.

Figure 27:
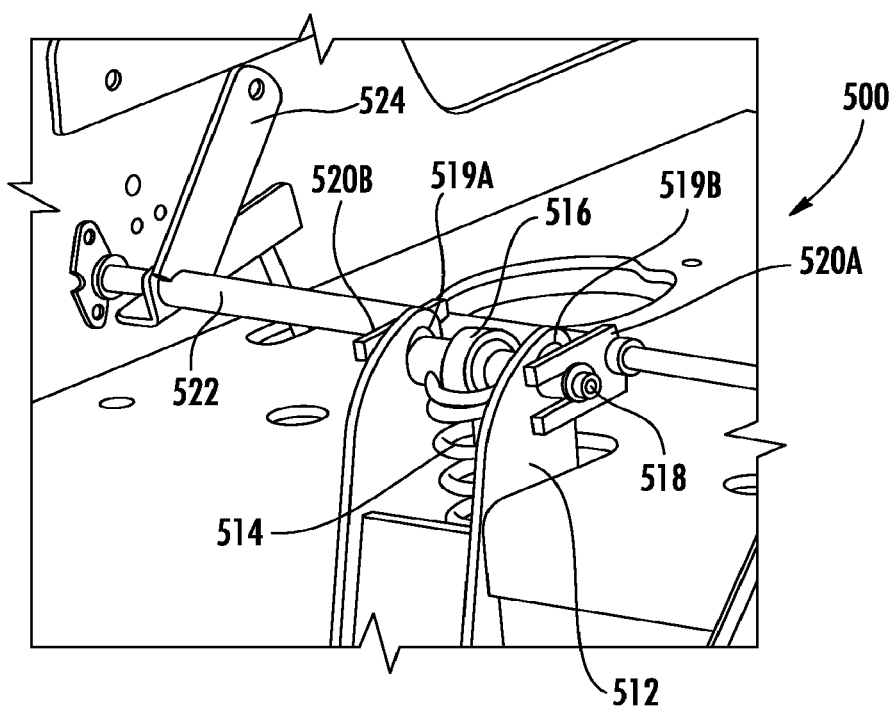
FIG. 27 is a partial perspective view of an operator presence and neutral biasing mechanism for a suspended platform in accordance with another exemplary embodiment.
Figure 28:
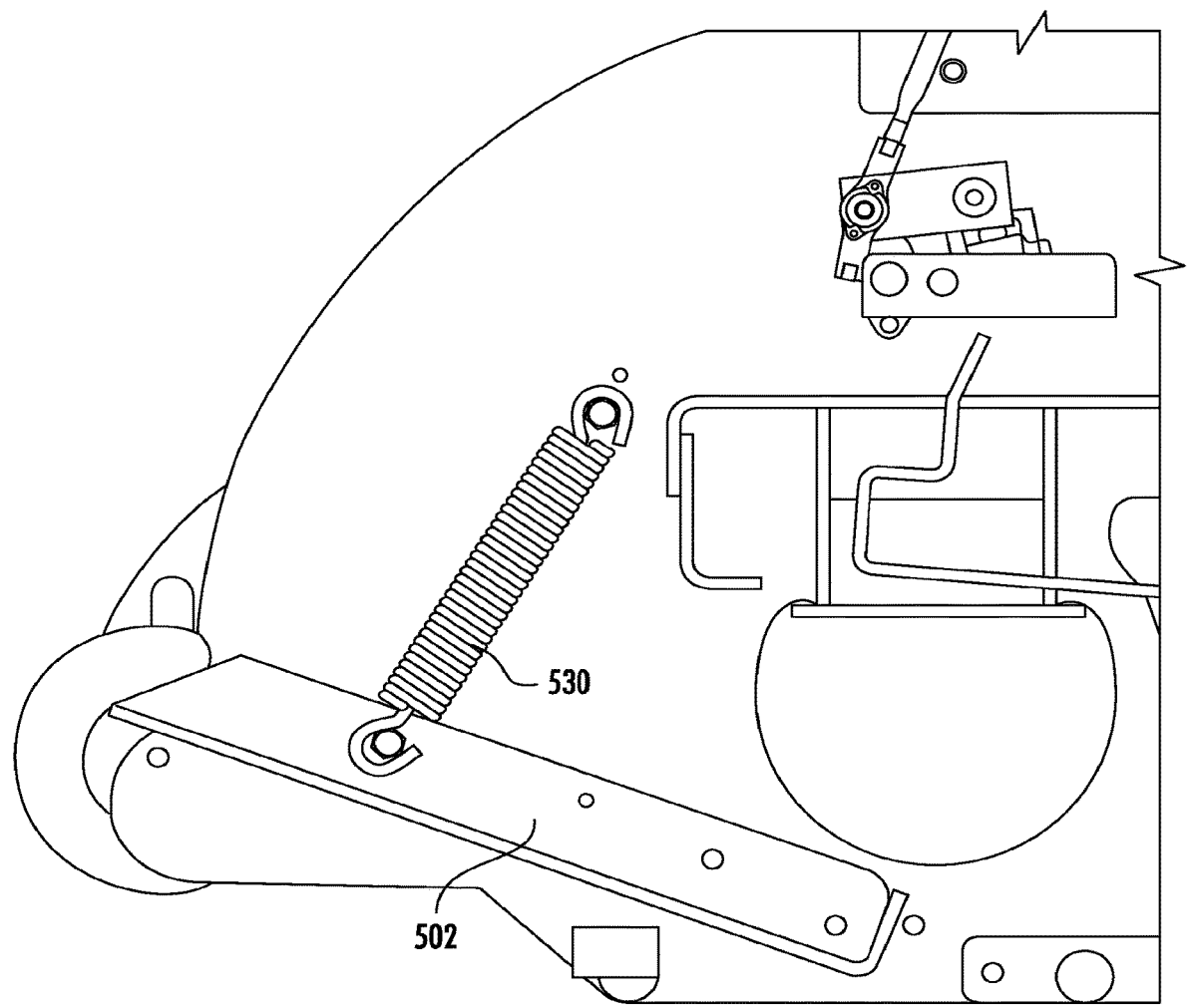
FIG. 28 is a partial side view of an operator platform in accordance with another exemplary embodiment.
Figure 29:
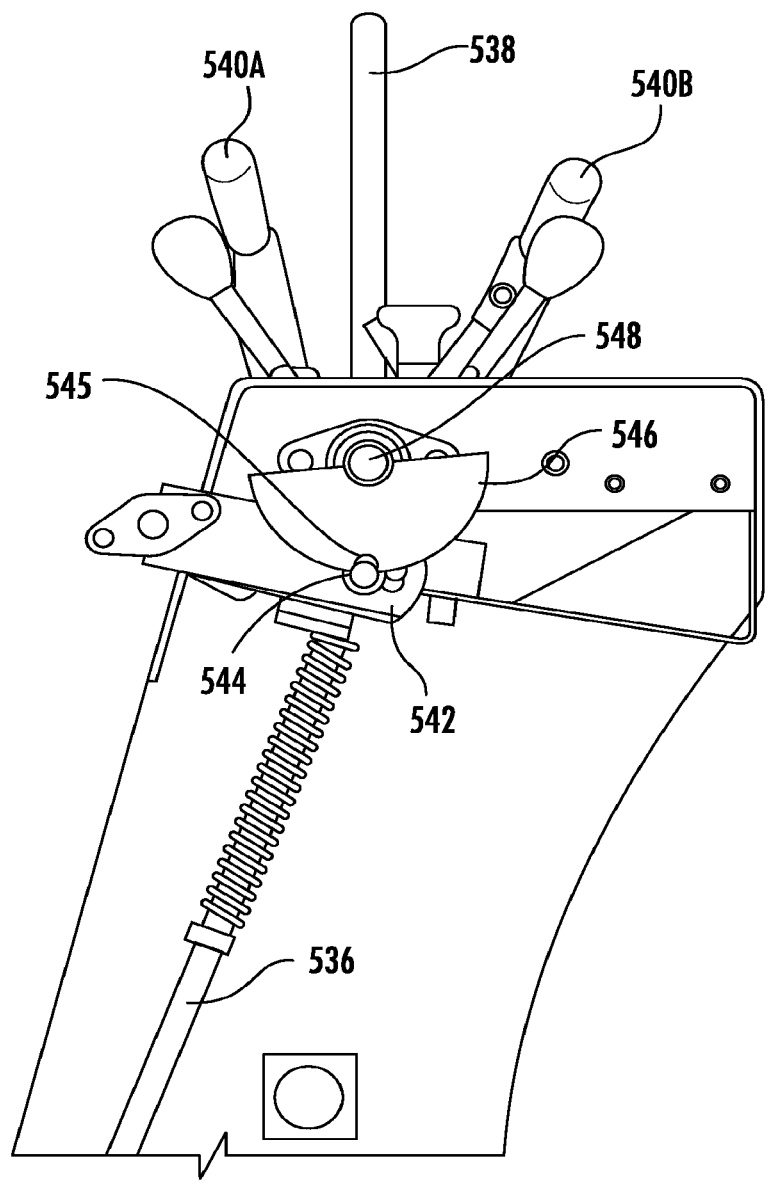
FIG. 29 is a partial side view of an operator control and neutral biasing mechanism in accordance with another exemplary embodiment.

Next, referring to FIGS. 27-29, an operator presence system and neutral biasing mechanism in accordance with another exemplary embodiment is shown. Similar to mower 400 discussed above, a mower 500 comprises a suspension device 514 coupled to an operator platform, such as platform 402 shown in FIG. 19, wherein suspension device 514 is pivotally coupled to a fixed bracket 512 on mower 500 via a bushing 516 on a pin 518. Pin 518 is retained in slots 519A, 519B formed in bracket 512, which allows for vertical translation of suspension device 514. In one implementation, suspension device 514 and bracket 512 are identical to suspension device 414 and bracket 412, respectively, described above, wherein suspension device 514 is pivotally mounted to suspension link 410 which is pivotally coupled to platform 402 by adjustment plate 406 and suspension adjustment linkage 408 as shown and described above with respect to FIGS. 19-26.

In operation, an extension spring 530 shown in FIG. 28 pulls suspension device 514 down in slots 519A, 519B when an operator is not standing on platform 502. Two forked tabs 520A, 520B are in contact with pin 518 and rotate about a rod 522 with respect to the frame of mower 500. When suspension device 514 is pulled down in slots 519 (i.e., when an operator is not present on platform 502), rod 522 rotates counterclockwise and in turn moves a control linkage tab 524 in a counterclockwise direction. Referring to FIG. 29, control linkage tab 524 is coupled to a rod 536, which is coupled at another end to a pin 544 and pivotal arm 542. As a result, rotation of controlling 524 in the counterclockwise direction (as seen in FIG. 27) pushes rod 536 upward to pivot arm 542 such that pin 544 experiences an upward force.

In the configuration shown in FIG. 29, pin 544 is in contact with a notch 545 of a neutral biasing tab 546. Neutral biasing tab 546 is coupled to the control levers 538 of mower 500, which are capable of moving between a rear stop 540A and a front stop 540B to enable forward and rearward movement of mower 500. Neutral biasing tab 546 and control levers 538 rotate about a pivot point 548. When pin 544 is in contact with notch 545 of neutral biasing tab 546, control levers 538 are biased to (and substantially locked in) their neutral position. Pin 544 is moved upward into contact with notch 545, in response to rod 536 being pushed upward, when suspension device 514 is pulled down in slots 519A, 519B, which again occurs when there is no operator standing on platform 502. Accordingly, the system shown in FIGS. 27-29 acts as an operator presence system, wherein the control levers 538 are unable to move out of the neutral position unless an operator is standing on platform 502, and the control levers are biased to neutral once an operator steps off of platform 502.

On the other hand, when an operator does step onto platform 502, the operator's weight overcomes extension spring 530 and causes suspension device 514 to slide upward in slots 519A, 519B, thereby rotating rod 522 and control linkage tab 524 in a clockwise direction for an S in FIG. 27). This, in turn, pulls rod 536 downward and pulls pin 544 downward out of detent or notch 545 of neutral biasing tab 546, enabling control levers 538 to move freely between stops 540A, 540B.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A standing ride on mower comprising:
   a frame extending from a front end to a rear end;
   a right drive wheel supporting the frame proximate the rear end;
   a left drive wheel supporting the frame proximate the rear end;
   a prime mover supported by the frame;
   a right side integrated transaxle operating under the influence of the prime mover to drive rotation of the right drive wheel, the right side integrated transaxle including a right side single housing, a right hydraulic pump housed within the right side single housing, and a right hydraulic motor housed within the right side single housing;
   a left side integrated transaxle operating under the influence of the prime mover to drive rotation of the left drive wheel, the left side integrated transaxle including a left side single housing, a left hydraulic pump housed within the left side single housing, and a left hydraulic motor housed within the left side single housing; and
   an operator platform to support a standing operator of the mower, the operator platform extending at least partially beneath the right side integrated transaxle and the left side integrated transaxle such that a first vertical plane that includes a rearmost portion of the right side integrated transaxle and a rearmost portion of the left side integrated transaxle intersects the operator platform so that a portion of the standing operator's feet are beneath at least a portion of the right side integrated transaxle and the left side integrated transaxle such that the vertical plane intersects the portion of the standing operator's feet, wherein a distance between an innermost portion of the right side integrated transaxle and an innermost portion of the left side integrated transaxle is less than a width of the operator platform.

2. The mower of claim 1, further comprising a cutting deck assembly supported by the frame, the cutting deck assembly comprising a cutting deck, wherein the cutting deck comprises at least one cutting blade mounted under the cutting deck and rotatable under influence of the prime mover.

3. The mower of claim 1, wherein the operator platform has an upper surface directly underlying the right side integrated transaxle and the left side integrated transaxle, the upper surface of the operator platform spaced at least 2 inches below the right side integrated transaxle and the left side integrated transaxle.

4. The mower of claim 1, wherein the operator platform is pivotable about a pivot axis between a raised position in absence of the operator and a lowered position during presence of the operator standing on the platform, and wherein a line at which the vertical plane intersects the operator platform is located rearward of the pivot axis.

5. The mower of claim 4, where the operator platform rearwardly extends at an upward angle of at least 10 degrees relative to horizontal in the lowered position.

6. The mower of claim 4, wherein the operator platform rearwardly extends in an upward angle of at least 15 degrees relative to horizontal in the raised position.

7. The mower of claim 4, further comprising a parking brake coupled to the operator platform.

8. The mower of claim 7, wherein the parking brake is automatically engaged in response to the operator platform being in the raised position.

9. The mower of claim 4, wherein the right drive wheel and the left drive wheel rotate about a drive axis, and wherein the pivot axis is located rearward of the drive axis.

10. The mower of claim 1, wherein the operator platform pivots about a pivot axis beneath the left side single housing and beneath the right side single housing.

11. A standing ride on mower comprising:
    a frame extending from a front end to a rear end;
    a right drive wheel supporting the frame proximate the rear end;
    a left drive wheel supporting the frame proximate the rear end;
    a parking brake to resist movement of the right drive wheel and the left drive wheel;
    a prime mover supported by the frame;
    a cutting deck assembly supported by the frame, the cutting deck assembly comprising a cutting deck and at least one cutting blade mounted under the cutting deck and rotatable under influence of the prime mover;
    a blade drive which, when engaged, transmits torque to the at least one cutting blade to rotate the at least one cutting blade and when disengaged, interrupts transmission toward to the at least one cutting blade;

a right side integrated transaxle operating under the influence of the prime mover to drive rotation of the right drive wheel, the right side integrated transaxle including a right side single housing, a right hydraulic pump housed within the right side single housing, and a right hydraulic motor housed within the right side single housing;

a left side integrated transaxle operating under the influence of the prime mover to drive rotation of the left drive wheel, the left side integrated transaxle including a left side single housing, a left hydraulic pump housed within the left side single housing, and a left hydraulic motor housed within the left side single housing;

an operator platform to support a standing operator of the mower, wherein the operator platform extends at least partially beneath the right side integrated transaxle and the left side integrated transaxle such that a first vertical plane that includes a rearmost portion of the right side integrated transaxle and a rearmost portion of the left side integrated transaxle intersects the operator platform so that a portion of the standing operator's feet are positioned beneath at least a portion of the right side integrated transaxle and the left side integrated transaxle such that the vertical plane intersects the portion of the standing operator's feet, wherein a distance between an innermost portion of the right side integrated transaxle and an innermost portion of the left side integrated transaxle is less than a width of the operator platform; and wherein the parking brake is automatically engaged and a blade drive engager automatically disengages the blade drive in response to absence of an operator upon the operator platform while the prime mover continues to operate.

12. The mower of claim 11, wherein the operator platform extends directly beneath the left side single housing and directly beneath the right side single housing.

13. A standing ride on mower comprising:
a frame extending from a front end to a rear end;
a right drive wheel supporting the frame proximate the rear end;
a left drive wheel supporting the frame proximate the rear end;
a prime mover supported by the frame;
a cutting deck assembly supported by the frame, the cutting deck assembly comprising a cutting deck at least one cutting blade mounted under the cutting deck and rotatable under influence of the prime mover;
a right side integrated transaxle operating under the influence of the prime mover to drive rotation of the right drive wheel, the right side integrated transaxle including a right side single housing, a right hydraulic pump housed within the right side single housing, and a right hydraulic motor housed within the right side single housing;
a left side integrated transaxle operating under the influence of the prime mover to drive rotation of the left drive wheel, the left side integrated transaxle including a left side single housing, a left hydraulic pump housed within the left side single housing, and a left hydraulic motor housed within the left side single housing;
an operator platform to support a standing operator of the mower, wherein the operator platform extends at least partially beneath the right side integrated transaxle and the left side integrated transaxle such that a first vertical plane that includes a rearmost portion of the right side integrated transaxle and a rearmost portion of the left side integrated transaxle intersects the operator platform so that a portion of the standing operator's feet are positioned beneath at least a portion of the right side integrated transaxle and the left side integrated transaxle such that the vertical plane intersects the portion of the standing operator's feet, wherein a distance between an innermost portion of the right side integrated transaxle and an innermost portion of the left side integrated transaxle is less than a width of the operator platform;
a suspension to resiliently support the operator platform; and
a suspension adjuster to adjust a degree of resistance provided by the suspension against movement of the operator platform.

14. The mower of claim 13, wherein the suspension adjuster comprises:
a support having a plurality of mounting locations, each of the mounting locations being differently spaced from a pivot axis of the operator platform; and
a resilient support operably coupled to the operator platform and mounted at a selected one of the mounting locations.

15. The mower of claim 13, wherein the operator platform extends directly beneath the left side single housing and directly beneath the right side single housing.

16. The mower of claim 13, wherein the suspension adjuster is configured to be coupled to the operator platform at a suspension adjustment plate mounted on the operator platform, the suspension adjustment plate having a plurality of holes for enabling a plurality of user selectable suspension compliance settings.

17. The mower of claim 13, wherein the suspension adjuster comprises a coil-over-shock suspension device.

18. The mower of claim 13, wherein the operator platform pivots about the frame along a pivot point.

19. The mower of claim 18, wherein a hole of a suspension adjustment plate nearest the pivot point of the operator platform enables the lightest suspension compliance setting, while a hole of the suspension adjustment plate furthest from the pivot point of the operator platform enables the stiffest suspension compliance setting.

20. The mower of claim 13, further comprising a neutral biasing mechanism coupled to the suspension adjuster, wherein the neutral biasing mechanism returns at least one operator control lever of the mower to a neutral position when the operator is not present on the platform.

* * * * *